(12) United States Patent
Wang et al.

(10) Patent No.: US 10,861,335 B2
(45) Date of Patent: Dec. 8, 2020

(54) PARKING MANAGEMENT SYSTEM AND PARKING SPACE MANAGEMENT METHOD

(71) Applicants: HUNAN SCIENTOP AUTOMATIC EQUIPMENT SHARES CO. LTD, Changsha (CN); Shen Wang, Changsha (CN)

(72) Inventors: Shen Wang, Changsha (CN); Changyuan Fang, Changsha (CN); Wen Long, Changsha (CN)

( * ) Notice: Subject to any disclaimer, the term of this patent is extended or adjusted under 35 U.S.C. 154(b) by 0 days.

(21) Appl. No.: 16/692,341

(22) Filed: Nov. 22, 2019

(65) Prior Publication Data
US 2020/0105140 A1 Apr. 2, 2020

Related U.S. Application Data

(63) Continuation of application No. PCT/CN2017/114885, filed on Dec. 7, 2017.

(30) Foreign Application Priority Data

Nov. 16, 2017 (CN) .......................... 2017 1 1136713

(51) Int. Cl.
*G08G 1/14* (2006.01)
*H04W 4/80* (2018.01)
(Continued)

(52) U.S. Cl.
CPC ............. *G08G 1/149* (2013.01); *G06Q 10/02* (2013.01); *G06Q 20/3278* (2013.01);
(Continued)

(58) Field of Classification Search
None
See application file for complete search history.

(56) References Cited

U.S. PATENT DOCUMENTS 7,135,991 B2 * 11/2006 Slemmer .................. G08G 1/14
340/932.2
7,783,530 B2 * 8/2010 Slemmer ................ G06Q 10/02
705/28
(Continued)

FOREIGN PATENT DOCUMENTS

CN 103731491 A * 4/2014
CN 103731491 A 4/2014
(Continued)

OTHER PUBLICATIONS

Internation Search Report of PCT/CN2017/114885, dated Jul. 30, 2018.

*Primary Examiner* — Fekadeselassie Girma
(74) *Attorney, Agent, or Firm* — Erson IP (Nelson IP)

(57) ABSTRACT

A parking management system and a parking space management method are provided. In this system, intelligent parking locks are capable of performing two-way data communication with a cloud platform and executing an action instruction issued by the cloud platform, which realizes parking space sharing, open and intelligent management and monitoring. One-key navigation parking and one-key car searching can be realized since the intelligent parking locks include Bluetooth positioning and/or multiple GPS combined with mobile internet applications. The problems in searching for a parking space and searching for one's own car are hence well solved. The induction type parking locks control system ensures automatic locking and unlocking operations according to the distance between the mobile terminal and the parking locks, which significantly improves user's experiences.

10 Claims, 15 Drawing Sheets

(51) Int. Cl.
  *G06Q 10/02* (2012.01)
  *G06Q 20/32* (2012.01)
  *G07F 17/24* (2006.01)

(52) U.S. Cl.
  CPC ........... *G07F 17/246* (2013.01); *G08G 1/144* (2013.01); *G08G 1/146* (2013.01); *H04W 4/80* (2018.02)

(56) References Cited

U.S. PATENT DOCUMENTS

| | | | |
|---|---|---|---|
| 8,279,088 B2 | 10/2012 | Khim | |
| 8,589,065 B2 * | 11/2013 | Scofield | G01C 21/3685 701/400 |
| 8,665,118 B1 * | 3/2014 | Woodard | G08G 1/148 340/932.2 |
| 8,843,307 B1 * | 9/2014 | Kolodziej | G08G 1/147 701/410 |
| 8,994,560 B2 * | 3/2015 | Anderson | G08G 1/202 340/932.2 |
| 9,035,799 B2 * | 5/2015 | Love | G08G 1/146 340/932.2 |
| 9,116,546 B2 * | 8/2015 | Birnbaum | G06F 1/1626 |
| 9,267,812 B1 * | 2/2016 | Sachdev | G01C 21/3685 |
| 9,330,570 B2 * | 5/2016 | Wang | G08G 1/144 |
| 9,478,134 B2 * | 10/2016 | Narayanan | G08G 1/0112 |
| 9,635,115 B2 * | 4/2017 | Hong | H04L 67/36 |
| 9,747,798 B2 * | 8/2017 | Moise | G08G 1/147 |
| 9,767,690 B2 * | 9/2017 | Agrawal | G08G 1/012 |
| 9,854,396 B2 * | 12/2017 | Himmelreich | G08G 1/012 |
| 9,911,336 B2 * | 3/2018 | Schlechter | G08G 1/005 |
| 9,967,329 B2 * | 5/2018 | Reber | H04L 67/18 |
| 9,984,572 B1 * | 5/2018 | Newman | G06K 9/00812 |
| 9,990,850 B2 * | 6/2018 | Wauldron | G08G 1/205 |
| 10,163,347 B2 * | 12/2018 | Neystadt | G08G 1/165 |
| 10,198,949 B2 | 2/2019 | Becker | H04L 9/0637 |
| 10,235,816 B2 * | 3/2019 | Dutta | G07F 17/246 |
| 10,268,899 B2 * | 4/2019 | Cai | G06K 9/00771 |
| 10,403,144 B1 * | 9/2019 | Ledet | G08G 1/144 |
| 10,453,334 B2 * | 10/2019 | Barajas Gonzalez | G08G 1/0112 |
| 10,458,809 B2 * | 10/2019 | Flores | G08G 1/0969 |
| 10,467,894 B2 * | 11/2019 | Neumayer | G01C 21/206 |
| 10,713,642 B2 * | 7/2020 | Powell | G07F 17/24 |
| 2012/0265434 A1 * | 10/2012 | Woodard | G08G 1/147 701/423 |
| 2012/0299749 A1 | 11/2012 | Xiao et al. | |
| 2016/0090055 A1 * | 3/2016 | Breed | B60N 2/0244 701/2 |
| 2018/0276575 A1 | 9/2018 | Koreishi | |

FOREIGN PATENT DOCUMENTS

| | | | |
|---|---|---|---|
| CN | 103942977 A | | 7/2014 |
| CN | 204596177 U | | 8/2015 |
| CN | 106157687 A | * | 11/2016 |
| CN | 106157687 A | | 11/2016 |
| CN | 106601019 A | | 4/2017 |
| CN | 106710300 A | | 5/2017 |
| CN | 107248307 A | | 10/2017 |
| JP | 2000182187 A | | 6/2000 |

* cited by examiner

PARKING MANAGEMENT SYSTEM AND PARKING SPACE MANAGEMENT METHOD

CROSS-REFERENCE TO RELATED APPLICATIONS

This application is a continuation of International Patent Application No. PCT/CN2017/114885 with a filing date of Dec. 7, 2017, designating the United States, and further claims priority to Chinese Patent Application No. 201711136713.0 with a filing date of Nov. 16, 2017. The content of the aforementioned applications, including any intervening amendments thereto, are incorporated herein by reference.

TECHNICAL FIELD

The present invention relates to a parking management system and a parking space management method.

BACKGROUND OF THE PRESENT INVENTION

With the development of the social economy, vehicles in a city have become more and more popular, and the number of vehicles is on a rise. Excessive increase of the number of the vehicles results in a growing shortage of parking space resources. Meanwhile, more and more vehicles run on the road and cause a great pressure on the traffic. Owners always get annoyed as their private parking spaces are often occupied by outside vehicles. Vehicle streams inside and around a parking lot are gathered together, so that parking lot and traffic management personnel need to direct the vehicles all the time. In order to normalize the parking order and relieve the traffic pressure, it is very important to effectively manage and reasonably use the parking spaces.

At present, there are two types of main parking locks: mechanical and remotely controlled parking locks. These parking locks can solve, to a certain extent, the problem that the private parking spaces are occupied, but they are only to simply manage the parking spaces. Users need to get on and get off vehicles to operate the mechanical locks, and the remotely controlled locks cannot be remotely controlled and shared, so that, there is no way for the users to open and close the parking locks conveniently and quickly, and no way for the parking space resources to be used to the maximum extent.

There is a system for managing the parking locks through a wireless communication technology in the prior art. For example, the patent No. CN201210069152 or CN200910170092 discloses intelligent parking solutions such as license plate identification, wireless matching and RFID (radio frequency identification), but all these solutions require vehicle-mounted radio systems or RFIDs on vehicles, cannot be universally applicable to all the vehicles, and also cannot avoid the possible situation that users park the vehicles without following the rules. If a garage is very large, it is hard for a driver to quickly find a matched parking space, and the driver only has to drive around in this garage. Therefore, these solutions cannot be, really implemented.

There is still a method for managing a parking lock through an Internet or a local area network in the prior art. For example, the Chinese invention patent CN105336025A discloses an Internet and mobile Internet-based parking space management system which enables the users to manage and share their own parking locks by parking lock binding, but actually during implementation, a parking lock binding mode is extremely inflexible: a cloud platform generates a unique ID to bind a parking lock with a user. When a mobile terminal of the user is lost or is not carried, the user cannot control and share the parking lock. When using a sharing parking space or finding the vehicle reversely, the user cannot start map navigation through the mobile terminal to directly get to the parking space, thereby increasing the burden on searching the parking space. Meanwhile, tolling at an entrance/exit prolongs the occupation time and non-control time of parking spaces in a parking lot, thereby increasing the risk that the vehicles are parked in wrong places and the traffic pressure at the exit of the parking lot.

For another example Chinese invention patent CN105185158A mentions that an intelligent label is built through a mobile terminal to conduct radio frequency identification with an intelligent label parking lock to unlock the intelligent parking lock. However, this parking lock can be only managed in a parking lot, and is unfavorable for real-time asynchronous transfer or individual parking space management and users cannot share the use permissions of their own parking spaces, so that this technology is not applicable to a parking lock design aiming at unified management of the parking lots and management of the parking spaces by the users. Meanwhile, once the parking lock or a user terminal fails, this technology cannot find out this failure in real time and handle with it, resulting in user contradictions and a traffic jam in the parking lot.

In conclusion, the existing method for managing the parking lock through the Internet or the local area network cannot effectively relieve the situation of shortage of parking spaces and the traffic pressure, and cannot effectively improve the parking space utilization rate. The existing method also cannot meet requirements for control over the parking lock and use of the parking space in different cases due to various conditions and limitations. In addition, during daily use of the parking lock, it is inevitable that various motor or machinery failures, and even sabotage, may occur, affecting the normal use of the system. All the above-mentioned disclosures or approvals cannot check erroneous ideas at the outset to make a prewarning to parking lock failures in time and solve these failures in advance.

SUMMARY OF PRESENT INVENTION

For the purpose of solving the technical problems, in view of the shortcomings in the prior art, the present invention provides a parking management system and a parking space management method, so as to realize flexible control over parking locks, effectively manage parking, spaces and improve the parking space utilization rate.

In order to solve the above-mentioned technical problems, a technical solution of the present invention is as follows: a parking management system includes:

I) intelligent, parking locks: configured to perform two-way data communication with a cloud platform and execute an action instruction issued by the cloud platform;

II) the cloud platform: configured to store personal information of users, coded information of the parking locks, position information, installation type information, binding information, parking space sharing information, parking space reservation order information, vehicle information, parking space information of a parking lot, fee information, parking lock failure prewarning information and electric quantity prewarning information, to process various operation requests of the users sent through mobile terminals in real time, to return instant information, to acquire state and position data which are sent by the intelligent, parking locks in real time, to remotely issue control instructions to the intelligent parking locks, to perform two-way data communication with the intelligent parking locks, user terminals and a management unit, to store map data of a parking lot, to calculate relative positions between the mobile terminals and the intelligent parking locks in, real time, and to send the relative positions to the mobile terminals;

III) the management unit: configured to manage barrier gates of the entrance and exit of a local parking lot, license plate identification devices, guidance screens in the parking lot, a fee module, the parking spaces and the intelligent parking locks, wherein all the data of the management unit are synchronized with those in the cloud platform in real time; and IV) the mobile terminals: used by vehicle owners to log in accounts, bind and manage the parking locks, share the parking spaces, check the map information of a destination parking lot, the parking space information and the charge information, reserve the parking spaces, start one-key navigation after reservation to perform indoor navigation or reverse search of vehicle in real time after the users drive into the parking lot, and make online payment through the mobile terminal at the end of parking.

1) Each intelligent parking lock includes a micro controller, a power unit, a wireless communication unit, an electric quantity monitoring unit, an anti-collision and anti-damage detection unit, a position sensor, a voice unit, a parking lock driving unit, and a positioning and navigation unit. The micro controller is connected with the power unit, the wireless communication unit, the electric quantity monitoring unit, the anti-collision and anti-damage detection unit, the position sensor, the voice unit, the parking lock, driving unit and the positioning and navigation unit. The power unit is connected with the electric quantity monitoring unit, and the wireless communication unit communicates with the cloud platform. The positioning and navigation unit communicates with each mobile terminal which communicates with the cloud platform. The power management unit provides rated direct current working voltage for the micro controller, the wireless communication unit, the parking lock driving unit, the anti-collision and anti-damage detection unit, the voice unit and the positioning and navigation unit. The parking lock driving unit is connected with a parking lock lifting device through a mechanical transmission mechanism.

2) The wireless communication unit adopts a tri-Fi communication module or a GPRS (General Packet Radio Service) communication module. The Wi-Fi communication module or the GPRS communication module is connected with the micro controller through a serial port: and the micro, controller reads an unlocking/locking instruction received by the wireless communication unit from the cloud platform, controls the parking lock driving unit to drive the parking lock mechanical transmission mechanism and the parking lock lifting device to realize unlocking or locking of the parking lock, and uploads parking lock state information to the cloud platform through the wireless communication unit.

The micro controller is a main center for processing various signals, and controls the whole system to work harmonically. The low energy power unit is connected with the micro controller, the wireless communication unit, the positioning and navigation unit, the parking lock driving unit, the mechanical position sensor, the anti-collision and anti-damage detection unit and the voice unit, and provides, rated working voltage and current for them; and the voice unit is connected with the micro controller, and can make a "click" sound when the parking lock is unlocked or locked and sound a siren alarm when the parking lock is abnormal.

3) A low energy wireless communication module is embedded into the positioning and navigation unit, is connected with the micro controller in a serial port communication manner to complete data communication, and is connected with an I/O port of the micro controller through an I/O port to complete mutual, control of signals. The low energy wireless communication module transmits own ID in a broadcasting manner, and generates a varying level signal capable of awakening the dormant micro controller after completing data connection with each mobile terminal. The mobile terminal receives wireless broadcasting ID signals sent by the positioning and navigation unit and a wireless base station deployed near the parking space, and determines a position where the mobile terminal of user is and a target parking space position through a triangular positioning algorithm, so as to realize positioning, and navigation; and when the user terminal is beyond a range covered by the wireless broadcasting signal sent by the positioning and navigation unit of the parking lock, the user terminal has no communication interaction with the low energy wireless communication module embedded in the positioning and navigation unit. In a low energy broadcasting mode, the wireless communication module periodically broadcasts the wireless ID. The micro controller is in a dormant state, and the wireless communication unit, the parking lock driving unit and the voice unit are in non-work state. The mobile terminal of the user can generate wireless communication interaction with the low energy wireless communication module embedded in the positioning and navigation unit of the parking lock after starting a wireless receiving function to enter a wireless broadcasting effective covering range sent by the low energy wireless communication module embedded in the positioning and navigation unit of the parking lock and receiving the effective ID signal sent by the positioning and navigation unit of the parking lock control system; and the low energy wireless communication module automatically quits the low energy broadcasting mode and enters a data communication mode. Meanwhile, the low energy wireless communication module generates a varying level signal and sends the varying level signal to the I/O port of the micro controller through the I/O port connected with the micro controller to awaken the micro controller in the dormant state and enable the micro controller to enter a work state; and in the work state, the micro controller switches on a wireless communication unit circuit to communicate with the cloud platform, receives the unlocking or locking instruction issued by the cloud platform, and controls the parking lock driving unit to complete unlocking or locking.

4) The electric quantity monitoring unit linearly reduces battery voltage through a voltage division resistor, and then sends the voltage to an ADC (Analog-Digital Conversion) interface of the micro controller for analog/digital conversion, and the micro controller reports digital information of the electric quantity to the cloud platform through the wireless communication unit.

Another mode of the electric quantity monitoring unit is to linearly reduce the battery voltage through the voltage division resistor or directly send the battery voltage to a voltage comparator (including a LVD (Low Voltage Detection) IC (Integrated Circuit)) for comparison with alarm threshold voltage. The comparator sends a high or low level including a comparison result to the I/O port of the micro controller, and the micro controller reads the state of the I/O port to identify whether it is undervoltage or not, and then reports electric quantity state information to the cloud platform through the wireless communication unit.

A specific implementation process of the electric quantity monitoring unit for monitoring the electric quantity of a battery includes:

1) the battery voltage is linearly reduced through the voltage division resistor, and then is sent to the ADC for analog/digital conversion;

2) the micro controller reads the voltage digital value obtained by conversion, and compares the voltage digital value with a set alarm threshold value;

3) if the voltage digital value is lower than the alarm threshold value, the voice unit is switched on to sound an alarm, and an undervoltage state marker is sent to the cloud platform through the wireless communication unit; if the voltage digital value is not lower than the alarm threshold value, the current electric quantity data are sent to the cloud platform through the wireless communication unit; and 4) the cloud platform turns on an undervoltage alarm mechanism after receiving undervoltage state information, so as to inform the user or the parking lot management personnel to conduct maintenance and mark the parking lock in an undervoltage state.

The specific implementation process of the electric quantity monitoring unit for monitoring the electric quantity of the battery further includes:

1) the battery voltage is linearly reduced through the voltage division resistor or is directly sent to the voltage comparator for comparison with alarm threshold voltage;

2) the comparator sends the high or low level including the comparison result to the I/O port of the micro controller;

3) the micro controller reads the state of the 110 port to identify whether it is undervoltage or not, and if YES, the voice unit is switched on to sound an alarm, and the undervoltage state marker is sent to the cloud platform through the wireless communication unit; and 4) the cloud platform turns on the undervoltage alarm mechanism to inform the user or the parking lot management personnel to conduct maintenance and mark the parking lock in an undervoltage state.

5) The anti-damage detection unit connects a micro motion sensor (including, but not limited to, a ball switch, a micro switch and a G-sensor (gravity sensor)) to the I/O port of the micro controller; when the parking lock is damaged by an external force or is collided by a vehicle by accident, the sensor in the detection unit senses a vibration and/or a position offset generated thereby and then generates a level change; the micro controller reads these varying levels through the I/O port to acquire state information, then switches on the voice unit to sound an alarm, and reports alarm state information to the cloud platform through the wireless communication unit.

A specific implementation process of the anti-collision and anti-damage detection unit includes:

1), when the parking lock is damaged by the external force or is collided by a vehicle, the vibration and/or the position offset is generated, and the sensor (including, but not limited to, the ball switch, the micro switch, the photoelectric sensor and the G-sensor (gravity sensor)) senses the vibration and/or position offset generated thereby;

2), the micro controller switches on the voice unit after receiving these pieces of varying state information to sound an alarm, and sends the alarm state information to the cloud platform through the wireless communication unit; and 3), the cloud platform turns on the alarm mechanism (such as turning on cameras in the parking lot to take videos and informing the user and the parking lot management personnel) after receiving these pieces of alarm information.

6) The power unit consists of a low energy linear voltage stabilizer and a peripheral circuit, and is configured to supply a stable working voltage to the whole system, and the low energy linear voltage stabilizer has extremely low standby static current when the system is in a dormant state; and According to another mode, the power supply consists of a DC/DC conversion IC with extremely high electric energy conversion efficiency and a peripheral component, and the low energy power supply has a high-efficiency voltage conversion function when the system is in a working state, and provides a required stable working voltage for the system.

7) The parking lock driving unit is connected with the micro controller and a driving motor in the mechanical transmission mechanism. The parking lock driving unit controls the motor to work to drive the mechanical transmission mechanism and the lifting device, and is an action execution mechanism for unlocking and locking the parking lock.

The parking lock driving unit is characterized by being internally provided with a current sampling resistor connected in series with a motor, so that the micro controller not only controls the parking lock driving unit to realize clockwise rotation, anticlockwise rotation and stop of the motor, but also detects the working current of the motor in real time, and turns on a parking lock anti-collision protection mechanism according to detected suddenly changed current information.

8) The mechanical position sensor is arranged on the mechanical transmission mechanism, is connected with the low energy power unit and the micro controller, and is a detection mechanism for action states of unlocking and locking of the parking lock. The mechanical position sensor includes, but not limited to, a photoelectric switch and a micro switch. The micro controller detects on and off states of the sensor connected to the JO port to detect whether the lifting device completes unlocking and locking action detection.

A specific, process for realizing low energy of the control system of the power management unit includes:

1), the control system is in the working state only when unlocking and locking parking lock state information needs to be uploaded to the cloud platform, and is in the low-energy standby state at other times;

2), in a standby state, a Bluetooth module works under a low energy broadcasting mode to broadcast its own parking lock ID signal;

3), after the user opens Bluetooth communication and a user APP with the mobile terminal, and drives into an effective communication distance with a target parking lock Bluetooth module, the APP on the mobile terminal is automatically matched with the target Bluetooth module for data connection;

4), after the data connection is succeeded, the Bluetooth module generates a varying level, and sends the varying level signal to the micro controller;

5), the micro controller is awakened by means of level triggering, quits the standby state, and starts to work.

The prevent invention further provides a parking space management method, including:

(I) a parking lot map drawing method and a positioning algorithm:

1) conducting, indoor vector map equal-proportion drawing by using a drawing tool according to a garage design drawing, an architectural drawing and a CAD graph, and manufacturing effects such as 2d, 2.5d and 3d effects;

2) publishing a garage map by using a map engine, and providing functions, such as map moving, zooming, rendering and spatial query, for a cloud platform;

3) inputting and storing unique codes and binding codes of parking, locks into the cloud platform after the parking locks are produced;

4) inputting and storing built-in/external Bluetooth ID data of the parking locks into the cloud platform after the parking locks are produced;

5) arranging corresponding Bluetooth equipment on the entrance and exit of a parking lot and roads in the parking, lot according to a positioning algorithm rule;

6) during drawing of the garage map, marking a parking lock position ID for each parking space;

7) during drawing of the garage map, marking IDs for the Bluetooth equipment arranged on the entrance and exit as well as the roads in the parking lot;

8) packaging and protecting topological relations of geometric data, and guidance data by using a positioning/navigation engine, and providing route analysis, topological analysis and information guidance functions for the cloud platform;

9) selectively installing the parking locks at the entrances or the middle parts of the parking spaces according to different parking lot designs and different planned parking space lengths during installation of the parking locks;

10) storing the installation positions of the parking locks into the cloud platform before the use of the parking locks, wherein the installation positions may be changed during use according to environmental changes;

11) storing finally drawn and published garage map data, into the cloud platform for mobile terminals to access, so as to facilitate expansion and maintenance in case of the environmental changes: and 12) enabling users to directly inquire and browse the map of a parking lot, to learn about the spatial layout and characteristics of the parking lot, to switch to browse different floors, and to check navigations and tracks of users, vehicles and parking spaces on the mobile terminals.

(II) A navigation positioning and automatic unlocking part:

1) wireless base stations installed on both sides of a road in the parking lot and positioning and navigation units in intelligent parking locks broadcast signals including parking lock IDs;

2) a driver uses a mobile terminal with a started wireless communication function, and drives into the parking lot;

3) the mobile terminal is used for scanning one of the signals including the parking lock IDs, and sending the scanned signal including the parking lock ID and the intensity of the signal to the cloud platform, and the cloud platform determines the position where the mobile terminal of the user is located and a target parking space position through a triangular positioning algorithm, so as to provide positioning, and navigation for the mobile terminal:

4) when the mobile terminal finds the target parking lock ID, and the intensity of the signal including the target parking lock ID is equal to an unlocking threshold value, the cloud platform or the mobile terminal sends an unlocking instruction to the parking lock;

5) after receiving the unlocking instruction, the parking lock switches on a parking lock driving unit circuit to drive a mechanical transmission mechanism and a lifting device to complete an automatic unlocking action;

6) parking lock state it is sent to the cloud platform for processing through a wireless communication unit for user query;

(III) a positioning and automatic locking part:

1) when the mobile terminal scans no signal including the target parking, lock. ID or the intensity of the scanned signal is lower than the threshold value, it indicates that the vehicle has been parked, and the driver carrying the mobile terminal has left the place near the parking lock, so that the mobile terminal uploads position information to the cloud platform;

2) the cloud platform issues a locking instruction to the parking lock according to the position information uploaded by the mobile terminal, and the parking lock switches on the parking lock driving unit to complete a parking lock locking action;

3) parking lock state information is sent to the cloud platform for processing through the wireless communication unit and for user query at the same time;

(IV) parking lock binding:

1) parking lock codes and, parking lock binding codes are input into the mobile terminals;

2) if the users type in the correct parking lock codes and parking lock binding codes, it indicates binding success;

(V) parking space sharing:

1) each mobile terminal displays parking locks which have been bound by the user at present;

2) the user shares a parking lock which has not been shared yet at present through the mobile terminal, and sets a time period for sharing;

3) the cloud platform analyzes, verifies and stores data submitted by the user, and within the time period for sharing, the cloud platform forbids the user to randomly control the parking lock to be unlocked and locked;

4) within the time period for sharing, which is set by the user, if the parking space is not reserved and no real-time orders are produced, the user cancels the parking space sharing.

(VI) The way for a user who has made a reservation to use the parking space:

1) the user connects the mobile terminal to an Internet;

2) the user types in a parking destination, and checks a list of parking lots near the destination and the number of remaining parking spaces;

3) the user selects parking spaces to be reserved on a garage map of a parking lot with the mobile terminal to reserve available parking spaces in the parking lot;

4) the cloud platform calculates a due prepaid expense according to a reserved parking space retention rule and a parking expense rule of the current parking lot, and the mobile terminal displays the due prepaid expense; after paying the money successfully, the user submits reservation order information to the cloud platform;

5) the cloud platform sends the order information to a management unit, and sends reservation success information to the mobile terminal of the user to indicate the user to turn on the Bluetooth function and the Wifi connection function of the mobile terminal;

6) after reserving the parking space successfully, the user uses the mobile terminal to automatically navigate to the entrance of the parking lot;

7) the management unit matches the reservation order information with license plate information of the current user, so as to automatically open a barrier gate to let the reservation vehicle pass;

8) the cloud platform judges the current position of the user according to all the broadcast ID signals scanned by the mobile terminal of the user and the intensity of each signal, converts the position of the mobile terminal of the user in the map of the parking lot into user real-time coordinates in combination with coordinates of the target parking space and the distance to the target parking space, and conducts route planning and route guidance;

9) the cloud platform sends a route plan to the mobile terminal, and sends a route guidance to parking guidance screens in the parking lot;

10) the user checks a route plan track in real time through the mobile terminal, and navigates to the reserved parking space according to the track, or drives to the preserved parking space according to the route guidance on the parking guidance screens in the parking lot;

11) when the user reaches the place near the reserved parking space, and at the moment the mobile terminal of the user scans the signal including the target parking lock ID, and the intensity of the signal is equal to the unlocking threshold value, the cloud platform issues the unlocking instruction to the parking lock; after receiving the unlocking instruction, the parking lock switches on the parking lock driving unit circuit to drive the mechanical transmission mechanism and the lifting device to realize automatic unlocking;

12) the parking lock sends state information to the cloud platform in real time for processing and user query;

(VII) the way for a temporary vehicle to use a parking space:

1) when the vehicle reaches the entrance of the parking lot, a display screen at the entrance of the parking lot displays the number of remaining parking spaces; if all the parking spaces in the garage are occupied, the barrier gate is not opened, so as to forbid the vehicle to enter; if there are still parking spaces unoccupied in the garage, the barrier gate is automatically opened to allow the vehicle to enter;

2) the user selects parking spaces to be reserved with the mobile terminal to reserve available parking spaces;

3) the cloud platform calculates a due prepaid expense according to the reserved parking space retention rule and the parking expense rule of the current parking lot, and the mobile terminal displays the due prepaid expense; after paying the money successfully, the user submits reservation order information to the cloud platform;

4) the cloud platform sends the order information to the parking lot management system, sends reservation success information to the mobile terminal of the user, and indicates the user to turn on the Bluetooth function and the Wifi connection function of the mobile terminal;

5) the cloud platform judges the current position of the user according to all the current surrounding broadcast ID signals scanned by the mobile terminal of the user and the intensity of each signal, converts the position of the mobile terminal of the user in the map of the parking lot into user real-time coordinates in combination with coordinates of a target parking space and the distance to the target parking space, and conducts route planning and route guidance;

6) the user checks a route plan track in real time through the mobile terminal, and navigates to the reserved parking space according to the track, or drives to the preserved parking space according to the route guidance on the parking guidance screens in the parking lot;

7) when the user reaches the place near the reserved parking space, and at the moment, the mobile terminal of the user scans the signal including the target parking lock ID, and the intensity of the signal is equal to the unlocking threshold value, the cloud platform issues the unlocking instruction to the parking lock; after receiving the unlocking instruction, the parking lock switches on the parking lock driving unit circuit to drive the mechanical transmission mechanism and the lifting device to realize automatic unlocking;

8) the parking lock sends state information to the cloud platform in real time for processing and user query;

(VIII) User finds the vehicle reversely and drives the vehicle away from the garage:

A. when each intelligent parking lock in the parking lot is installed at the entrance of each parking space, 1) when the mobile terminal scans no signal including the target parking lock ID or the intensity of the scanned signal is lower than the threshold value, the cloud platform issues a locking instruction to the parking lock, and the parking lock switches on the parking lock driving unit to complete locking and sends parking, lock state information to the cloud platform;

2) the user sends all the broadcast ID signals and the intensities of the signals to the cloud platform by using the mobile terminal, and the cloud platform plans a vehicle finding route in real time according to the coordinates of the user and the coordinates of the parking space, and, guides the user to walk to the parking space;

3) the cloud platform acquires an unlocking request from the user;

4) the cloud platform generates order payment information in real time according to an actual parking time length of the user, and sends the information to the mobile terminal of the user;

5) the user makes a payment for the order through the mobile terminal;

6) when detecting that the user completes the payment, the cloud platform sends latest order information to the mobile terminal of the user and the parking lot management system, and issues an unlocking instruction to the intelligent parking lock;

7) after receiving the unlocking instruction, the intelligent parking lock switches on the parking lock driving unit circuit to drive the mechanical transmission mechanism and the lifting device to automatically lower the parking lock to complete unlocking, and sends parking lock state information to the cloud platform;

8) after the user completes the payment, when the mobile terminal is near the parking lock, if the intensity of the signal including the target parking lock ID, scanned by the mobile terminal, lasts for a time greater than a set normal time threshold value, the cloud platform sends alarm signals to the parking lock and the mobile terminal at the same time to remind the user to drive the vehicle away from the parking space;

9) when the mobile terminal is not near the parking lock, and cannot scan the signal including the target parking lock ID or the intensity of the scanned signal is lower than the threshold value, the cloud platform issues a locking instruction to the parking lock, and the parking lock switches on the parking lock driving unit to complete locking, and sends parking lock state information to the cloud platform;

10) when the user reaches the exit of the parking lot, the parking lot management system matches the latest order information of the user, and automatically opens the barrier gate to let the vehicle pass;

B. when each intelligent parking lock in the parking lot is installed at the middle part of each parking space, 1) when the mobile terminal scans no signal including the target parking lock ID or the intensity of the scanned signal is lower than the threshold value, the parking lock may not conduct the locking operation, and then sends parking, lock state information to the cloud platform in real time;

2) the mobile terminal scans all the broadcast ID signals and sends the scanned broadcast ID signals and the intensities of the signals to the cloud platform, and the cloud platform plans a vehicle finding route according to the coordinates of the user and the coordinates of the parking space immediately, and guides the user to walk to the parking, space;

3) the user makes a payment for an order, and the cloud platform generates order payment information in real time according to an actual parking time length of the user, and sends the information to the mobile terminal of the user;

4) the user makes a payment for the order through the mobile terminal;

5) when the mobile terminal is not near the parking lock, and cannot scan the Bluetooth broadcast signal including the target parking lock II) or the intensity of the scanned signal is lower than the threshold value, the cloud platform issues a locking instruction to the parking lock, and the parking lock switches on the parking lock driving unit to complete locking, and sends parking lock state information to the cloud platform;

6) when the user reaches the exit of the parking lot, the parking lot management, system matches the license plate information of the user;

7) if the user has, paid the expense, the parking lot management system opens the barrier gate to let the vehicle pass and the local management system sends latest state information of the order of the user to the cloud platform; if the user does not pay the parking expense before reaching the exit, the barrier gate of the exit of the garage is closed, and the parking lot management system at the exit sends non-payment vehicle information and time to the cloud platform;

8) the cloud platform generates the order payment information in real time according to the actual parking time length of the user, and sends the information to the mobile terminal of the user:

9) the user makes a payment for the order through the mobile terminal;

10) when detecting that the user completes the payment, the cloud platform sends the latest order information to the mobile terminal of the user and the parking lot management system;

11) the parking lot management system matches the latest order information of the user, and automatically opens the barrier gate to let the vehicle pass.

After the step 8) of the way for the temporary vehicle to use the parking space:

A. when each intelligent parking lock in the parking lot is installed at the entrance of each parking space:

9) when the mobile terminal scans no signal including the target parking lock ID or the intensity of the scanned signal is lower than the threshold value, the cloud platform issues a locking instruction to the parking lock, and at the moment, the parking lock automatically rises up to complete locking, and sends parking lock state information to the cloud platform;

10) if the intensity of the signal including the target parking lock ID, scanned by the mobile terminal, lasts for a time greater than a set normal parking time threshold value, the cloud platform sends alarm signals to the parking lock and the mobile terminal at the same time, and issues a locking instruction to the parking lock, so that the parking lock automatically rises up to complete locking; meanwhile, the parking lock sends the parking lock state information to the cloud platform in real time; after parking the vehicle, the user sends a locking request to the cloud platform through the mobile terminal; at the moment, after receiving the request of the user, the cloud platform issues the locking instruction to the parking lock, so that the parking lock automatically rises up to complete locking;

B. when each intelligent parking lock in the parking lot is installed at the middle part of each parking space:

9) if the intensity of the signal including the target parking lock ID, scanned by the mobile terminal, lasts for a time greater than a set normal parking time threshold value, the cloud platform sends an alarm signal instead of a locking instruction, and the parking lock sends real-time state information to the cloud platform;

10) after the user parks the vehicle on the parking space having the parking lock at the middle part, the mobile terminal may not display a locking operation entrance.

Compared with the prior art, the present invention has the beneficial effects as follows: the parking management system disclosed by the present invention is an Internet or local area network-based parking lock which can perform two-way data communication with the cloud platform through the wireless communication unit and execute the action instructions issued by the cloud platform, thereby facilitating implementation of management and monitoring of the parking locks, and the parking locks, have become nodes of the Internet of things which lays a reliable material basis, for sharing of the parking spaces. The positioning and navigation function of each parking lock may be combined with the mobile Internet to realize positioning, navigation and vehicle searching in an indoor parking lot, thereby solving the problem that it is hard to find a parking space and to find a vehicle. Meanwhile, the wireless module in the parking lock may communicate with the mobile terminal and the cloud platform, thereby realizing remote induction type automatic unlocking and locking, and enhancing the experience feeling of the user. The electric quantity monitoring unit of the battery may monitor the electric quantity of the battery in the parking lock in real time, and reports the electric quantity to the cloud management platform through the wireless communication unit, thereby greatly facilitating supervision and maintenance for the electric quantities of all the parking locks in the parking lot by the parking lot management personnel. Meanwhile, the parking management system is also an anti-collision and anti-damage parking lock control system. A prewarning mechanism of the system effectively protects the parking lock body from being damaged by the external force, and also prevents the parking lock from being damaged by accidental collision by the vehicle during unlocking or locking of the parking lock. The whole parking lock control system is a control system, in which ultralow static current or power is high in conversion and use efficiency, so that the number of times of charging or replacing the battery is greatly reduced. The parking lock control system of the present invention fundamentally guarantees the use value and the service life of the parking lock. The present invention further realizes unoccupation sharing of the parking spaces, and guarantees the maximum utilization of the parking space resources. The present invention further realizes parking lot map engine-based parking space reservation and navigation, so that the time that the user searches a parking space and the vehicle is saved. Meanwhile, the present, invention further avoids such a phenomenon that the vehicles in the parking lot are parked disorderedly, and avoids manual charge operation of the parking lot, so that the vehicle get-in and get-out efficiency is improved, the management of the parking lot is enhanced, and parking data of the parking lot are more visual and transparent.

DETAILED DESCRIPTION OF PREFERRED EMBODIMENTS

Figure 1:
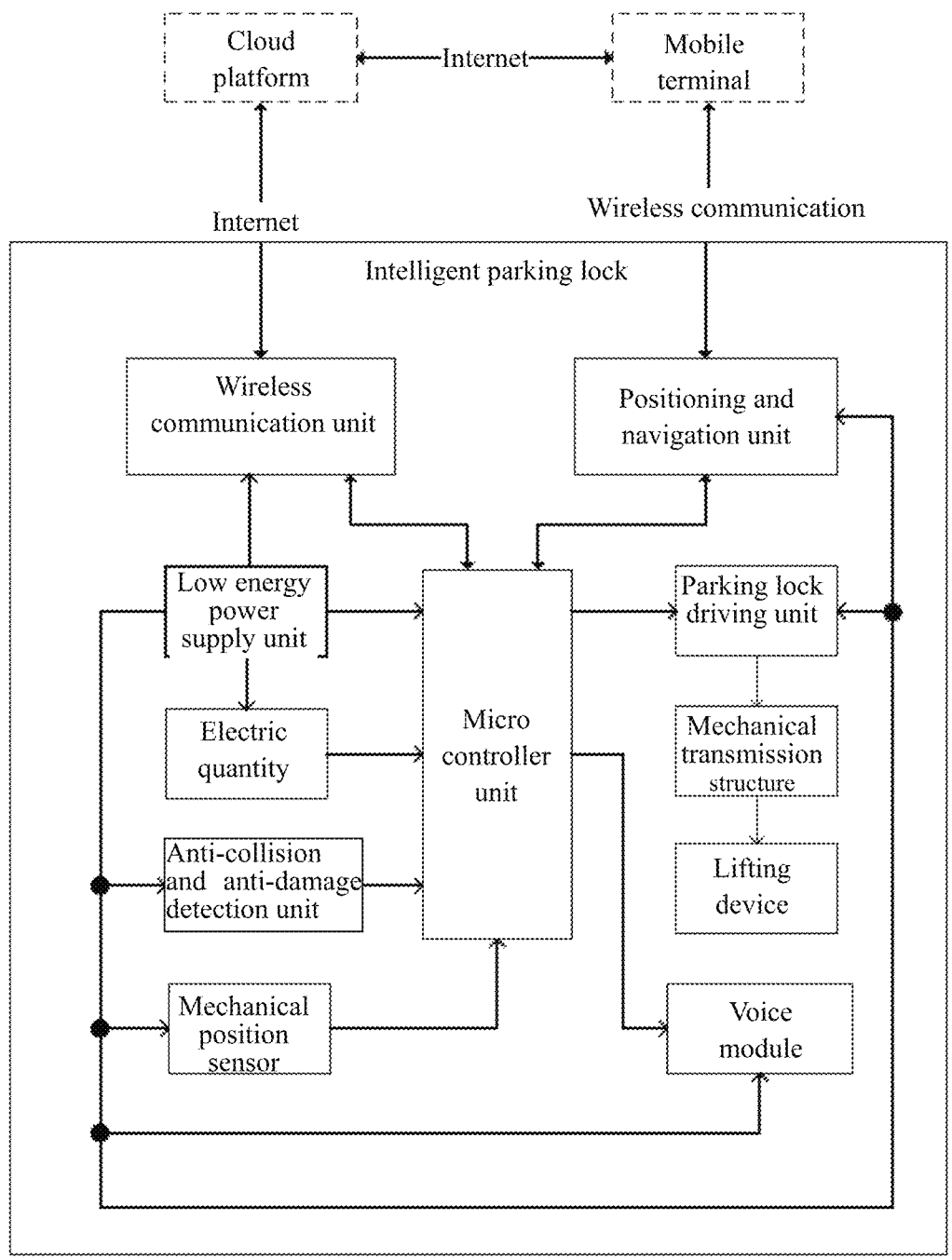
FIG. 1 is a functional block diagram of an intelligent parking lock control system of the present invention.

The present invention is further described below in combination with drawings: the present invention is provided with intelligent parking locks, a cloud platform, a management unit and mobile terminals.

Each intelligent parking lock is an Internet or local area network-based parking lock, which may receive a control instruction from the cloud platform and conduct unlocking or locking according to a received instruction signal. Meanwhile, the parking lock may also send various pieces of own state information to the cloud platform in real time, thereby realizing sharing and open type and intelligent management and monitoring of the parking lock. Meanwhile, the intelligent parking lock is a parking lock control system which includes Bluetooth positioning and multi-global-satellite positioning technologies and may realize parking space sharing, reservation, navigation parking and one-key vehicle finding by combining a smart phone APP or a Wechat Official account, and is also an induction type parking lock control system capable of automatically completing unlocking and locking after calculating relative positions between each mobile terminal and each parking lock.

The cloud platform is configured to store personal information of users, coded, information of the parking locks, position information, installation type information, binding information, parking space sharing information, parking space reservation order information, vehicle information, parking space information of a parking lot, fee information, parking lock failure prewarning information and electric quantity prewarning information, to process various operation requests, sent through mobile terminals, of the users in real time, to return instant information, to acquire state and position data which are sent by the parking locks in real time, to remotely issue control instructions to the parking locks, and to perform two-way data communication with the parking locks, the user terminals and the parking lot management system. The cloud platform further includes a map engine and a positioning/navigation engine. Map data of the parking lot are stored in the cloud platform after being drawn, and the cloud platform calculates relative positions between the mobile terminals and the parking locks in real time, and sends the relative positions to a garage map interface displayed in the mobile terminals. In a process that the user drives to a reserved parking space or finds the vehicle reversely, the mobile terminal may realize parking space navigation in real time.

The management unit manages barrier gates at the entrance and exit of a local parking lot, license plate identification devices, guidance screens in the parking lot, a fee module, the parking spaces, the parking locks and the like, wherein all the data of the management unit are synchronized with those in the cloud platform in real time. When a user who has made a reservation drives into the parking lot, the management unit automatically opens the barrier gate to let the vehicle pass; the parking lot management, system records the license plate of the vehicle and the get-in time, and meanwhile, the parking guidance screens in the parking lot may broadcast parking guidance information according to order data after the user drives into the parking lot. For a user having no reservation, when all the parking spaces in the garage are occupied, the system indicates the user having no reservation that no parking spaces are available, and the barrier gate would not be opened. When there are parking spaces unoccupied, the user having no reservation can follow a Wechat official account and an, applet of WeChat immediately, and use the parking space as required. Use method indication boards are placed at the entrance and exit of the garage and in the garage to remind the users to follow the official account to reserve and use the parking spaces, and instruct how to reserve the parking spaces successfully and use the parking spaces to the users with texts and pictures.

The mobile terminals of the users may be smart phones, IPAD, computers and the like, and are generally the smart phones. A parking space owner can log in an account through the mobile terminal to bind and manage the parking lock and share the parking space. The user can check the map information of a destination parking lot, the parking space information and the charge information, reserve the parking spaces, start one-key navigation after reservation to perform indoor navigation or reverse search of vehicle in real time after the user drive into the parking lot, and make online payment through the mobile terminal at the end of parking.

To use the present invention, it needs to draw a map of the parking lot and install the parking locks. This process includes the following steps:

1) conducting indoor vector map equal-proportion drawing by using a drawing tool according to a garage design drawing, an architectural drawing and a CAD graph, and manufacturing effects such as 2d, 2.5d and 3d effects;

2) publishing a garage map by using a map engine, and providing functions, such as map moving, zooming, rendering and spatial query, for a cloud platform;

3) inputting and storing unique codes and binding codes of the parking locks into the cloud platform after the parking locks are produced;

4) inputting and storing built-in/external Bluetooth ID data of the parking locks into the cloud platform after the parking locks are produced;

5) arranging corresponding Bluetooth equipment on the entrance and exit of the parking lot and roads in the parking lot according to a positioning algorithm rule;

6) during drawing of the garage map, marking a parking lock position ID for each parking space;

7) during drawing of the garage map, marking IDs for the Bluetooth equipment arranged on the entrance and exit, as well as the roads in the parking lot;

8) packaging and protecting topological relations of geometric data, and guidance data by using a positioning/navigation engine, and providing route analysis, topological analysis and information guidance functions for the cloud, platform;

9) selectively installing the parking locks at the entrances or the middle parts of the parking spaces according to different parking lot designs and different planned parking space lengths during installation of the parking locks;

10) storing the installation positions of the parking locks into the cloud platform before the use of the parking locks, wherein the installation positions may be changed during use according to environmental changes;

11) storing finally drawn and published garage map data into the cloud platform for mobile terminals to access, so as to facilitate expansion and maintenance in case of the environmental changes; and 12) enabling the users to directly inquire and browse the map of the parking lot, to learn about the spatial layout and characteristics of the parking lot, to switch to browse different floors, and to check navigations and tracks of the users, the vehicles and the parking spaces on the mobile terminals.

Before using the parking space sharing method of the present invention, the user needs to follow a Wechat official account corresponding to the method or use an applet of Wechat corresponding to the method. The following steps are included:

1) searching and successfully following the Wechat official account or scanning the applet of Wechat with the mobile terminal;

2) entering the Wechat official account or the applet of Wechat;

3) using a corresponding function menu.

The present invention is further described below in combination with FIG. 1. FIG. 1 is a functional block diagram of an intelligent parking lock control system in the contents of the present invention.

The parking lock control system includes a micro controller, a voice unit, a parking lock driving unit, a mechanical transmission mechanism, a lifting device and a mechanical position sensor, and is characterized in that the parking lock control system further includes a wireless communication unit, an electric quantity monitoring unit, a positioning and navigation unit, an anti-collision and anti-damage detection unit and a low energy power unit.

The micro controller is connected with the low energy power unit, the wireless communication unit, the electric quantity monitoring unit, the anti-collision and anti-damage detection unit, the position sensor, the voice unit and the parking lock driving unit. The micro controller is a main center for processing various signals, and controls the whole system to work harmonically. The low energy power unit is connected with the micro controller, the wireless communication unit, the positioning and navigation unit, the parking lock driving unit, the mechanical position sensor, the anti-collision and anti-damage detection unit and the voice unit, and provides rated working voltage and current for them; and the voice unit, is connected with the micro controller, and can make a "click" sound when the parking lock is unlocked or locked and sound a siren alarm when the parking lock is abnormal.

In the present embodiment, the wireless communication unit is a Wi-Fi communication module or a GPRS communication module, and is connected with the micro controller through a serial port. The micro controller reads an unlocking/locking instruction received by the wireless communication unit from the cloud platform to control the parking lock driving unit to drive the parking lock mechanical transmission mechanism and the lifting device to control the parking lock to be unlocked or locked. Meanwhile, the micro controller uploads parking lock state information to the cloud platform through the wireless communication unit;

The Wi-Fi module and the GPRS module provide various wireless communication choices for different parking lots to connect the cloud platform through the Internet or the local area network, and each parking lot can perform data communication with the cloud platform by selecting any one of the Wi-Fi module and the GPRS module, or by selecting a module having Wi-Fi and GPRS functions at the same time. The parking lock system of the patent of the present invention intelligently selects the communication mode, so as to meet requirements for environments and signal intensity of different parking lots; wireless routers may be deployed in indoor underground parking lots with low GPRS signal intensity, so that the parking lock micro controllers are connected into the Internet through the Wi-Fi modules to communicate with the cloud platform, and the parking lock micro controllers are connected into the Internet through the GPRS modules to communicate with, the cloud platform in outdoor places where the wireless routers are inconvenient to deploy, thereby effectively solving the problem that the parking locks may not be used in case of bad signal in different places.

Figure 2:
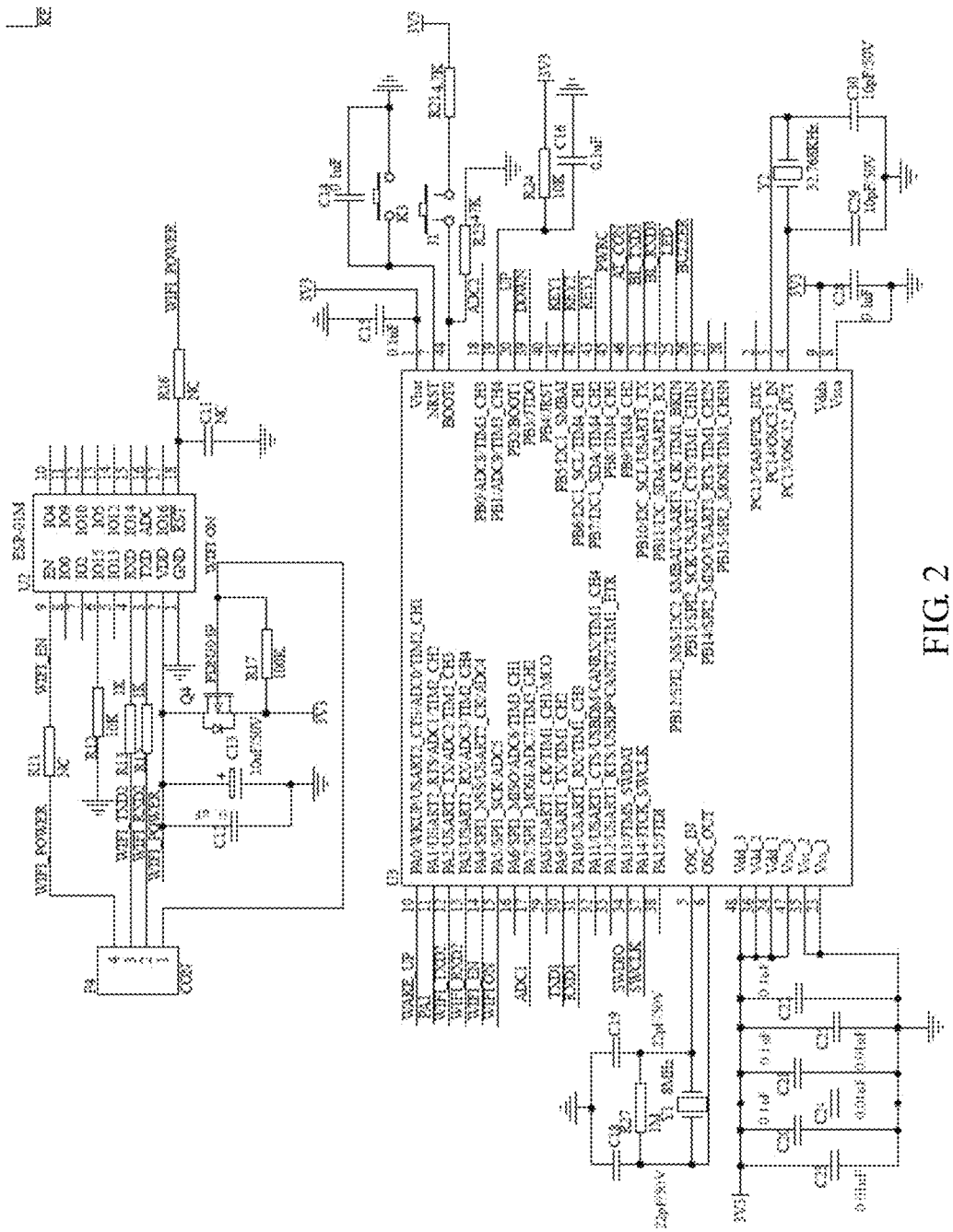
FIG. 2 is an implementation schematic diagram of a circuit formed by connecting a Wi-Fi module of a wireless communication unit with a micro controller in a specific implementation mode of an intelligent parking lock control system.

As shown in FIG. 2, it is an implementation schematic diagram of a circuit formed by connecting the Wi-Fi module of the wireless communication unit with the micro controller in the contents of the present application. A further description is made below in combination with FIG. 2:

As shown in FIG. 2, the Wi-Fi module U2 EPS8266 is connected with the serial port 2 of the micro controller U3 through two pins WIFI_TXD2 and WIFI_RXD2. The micro controller sends an AT instruction to the Wi-Fi module U2 through the serial port 2 to complete control over the module and realize, data communication with the cloud platform, so as to meet the requirement of the intelligent parking lock for a wireless communication function.

As shown in FIG. 2, system working power is marked by a network marker 3V3. When the parking lock control system is in an operating state, the micro controller outputs a low level from an I/O port marked by a network marker WIFI_O, so that Q4 is conducted to connect the power of the Wi-Fi module, thereby enabling the Wi-Fi module to work normally. The micro controller outputs a high level from the WIFI_ON I/O output when the parking lock system is in an idling dormant state, so that Q4 is switched off to cut off the working power of the Wi-Fi module, thereby reducing the dormant current of the parking lock control system.

Figure 3:
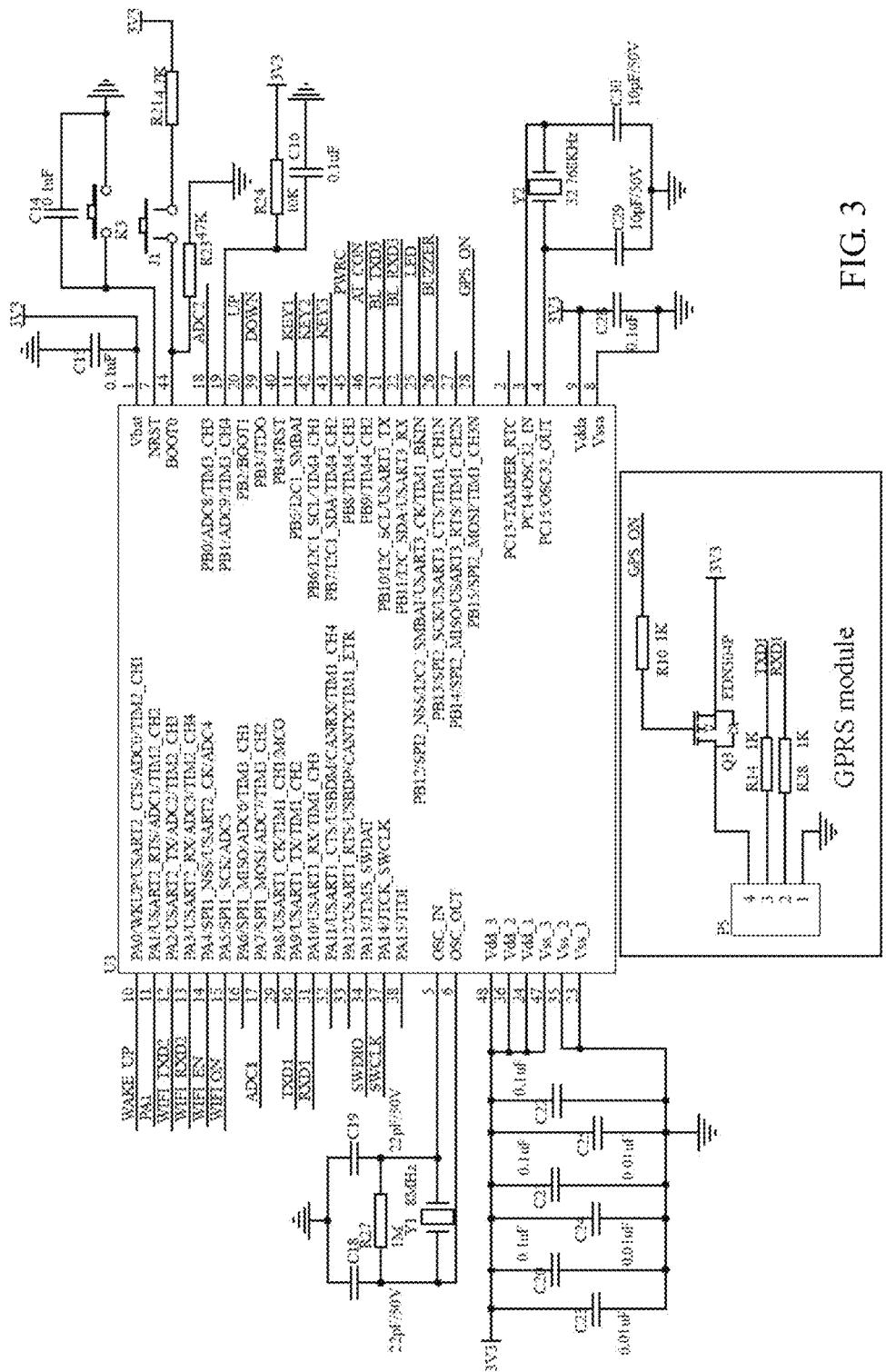
FIG. 3 is an implementation schematic diagram of an interface circuit formed by connecting a GPRS (General Packet Radio Service) module of a wireless communication unit with a micro controller in a specific implementation mode of an intelligent parking lock control system.

FIG. 3 shows an implementation schematic diagram of an interface circuit formed by connecting the GPRS module of the wireless communication unit with the micro controller in the contents of the present invention. A further description is made below in combination with FIG. 3:

In FIG. 3, the GPRS module is connected with a serial port 1 of the micro controller U3 through two pins TXD1 and RXD1 of an interface P5. The micro controller completes control over the module and realizes data communication with the cloud platform by means of unvarnished transmission of a serial port TTL level and AT instruction data, so as to meet the requirement of the intelligent parking lock for a wireless communication function.

In the present embodiment, a low energy wireless communication module is embedded into the positioning and navigation unit. The wireless communication module is a low energy Bluetooth module JDY-08 connected with the micro controller in a serial port communication manner to complete data communication, and is connected with the I/O port of the micro controller through an I/O port to complete mutual control of signals. The low energy wireless communication module broadcasts an own Bluetooth ID, and generates a varying level signal capable of awakening the dormant micro controller. The mobile terminal of the user receives Bluetooth broadcast ID signals sent by the positioning and navigation unit and a Bluetooth base station deployed near the parking space, and determines a position where the mobile, terminal of user is and a target parking space position through a triangular positioning algorithm, so as to realize positioning and navigation.

Figure 4:
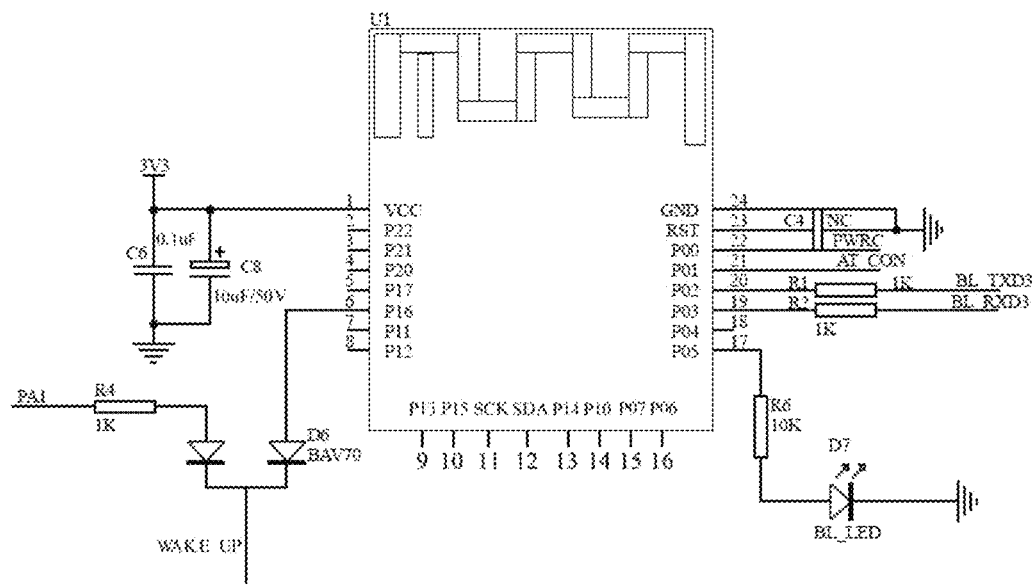
FIG. 4 is an implementation schematic diagram of a circuit formed by connecting a Bluetooth module of a positioning and navigation unit with a micro controller in a specific implementation mode of an intelligent parking lock control system.

FIG. 4 shows an implementation schematic diagram of a circuit formed by connecting the Bluetooth module of the positioning and navigation unit, with the micro controller in the contents of the present invention. A further description is made below in combination with FIG. 4:

The low energy Bluetooth module U1 JDY-08 is connected with a serial port 3 of the micro controller through BL_TXD3 and BL_RXD3. The micro controller completes data communication with the Bluetooth module U1 through the serial port 3. When the parking lock is in an idling mode, the micro controller is in a low energy dormant state, and the Bluetooth module U1 is in a low energy broadcasting mode, and broadcasts own Bluetooth ID to provide positioning for the parking lock system; after the mobile terminal of the user receives the ID signal broadcast by the Bluetooth module and completes matching with the Bluetooth module, the pin P16 of the Bluetooth module would generate a level varying from low to high, and this varying level passes through D6 and then is sent to the IO port of the micro controller through a network with the network marker WAKE_UP. The dormant micro controller is awakened by a state change of the external I/O port, and enters a working state. The micro controller in the working state completes data communication with the mobile terminal through the Bluetooth module.

In the present embodiment, another implementation mode of the positioning and navigation unit is that the positioning and navigation unit consists of a BLE Soc (Bluetooth Low Energy System on chip) nRF51822. The Bluetooth low energy system on chip includes a micro controller which may directly replace the micro controller function of the present invention. The system on chip broadcasts a parking lock ID through a Bluetooth communication function to complete positioning and navigation in the parking lock. The system on chip is connected with the Wi-Fi module through a serial port, and enables the parking lock to be connected into the Internet through the Wi-Fi module to, communicate with the cloud platform, to receive an unlocking or locking instruction issued by the cloud platform.

In the present embodiment, the electric quantity monitoring unit is configured to linearly reduce battery voltage through a voltage division resistor, and then send the battery voltage to an ADC (Analog-Digital Conversion) interface of the micro controller for analog/digital conversion. The micro controller reports digital information of an electric quantity to the cloud platform through the wireless communication unit, and the cloud platform automatically turns on an undervoltage alarm mechanism. The user can also check the electric quantity state of the parking lock at any time.

Figure 5:
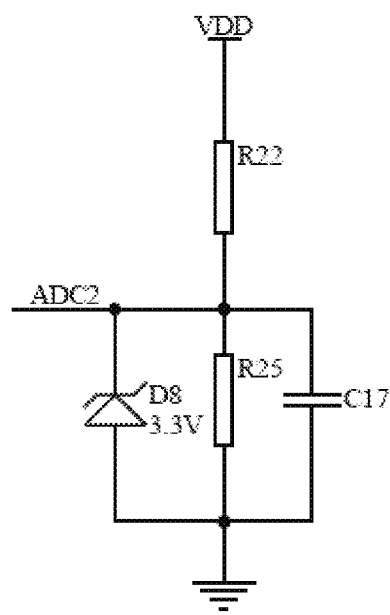
FIG. 5 is an implementation schematic diagram of a first electric quantity monitoring unit in a specific implementation mode of an intelligent parking lock control system.

FIG. 5 shows an implementation schematic diagram of one, electric quantity monitoring unit in the contents of the present invention. A further description is made below in combination with FIG. 5:

1) the battery voltage VDD is linearly divided through voltage division resistors R22 and R25, and then, is sent to an ADC2 channel of the ADC module of the micro controller for analog/digital conversion through a network ADC2, wherein a voltage stabilizing diode D8 achieves an effect of limiting the maximum value of an input voltage, so as to protect the micro controller;

2) the micro controller reads the voltage digital value obtained by conversion, and compares the voltage digital value with a set alarm threshold value;

3) if the voltage digital value is lower than the alarm threshold value, the voice unit is switched on to sound an alarm, and an undervoltage state marker is sent to the cloud platform through the wireless communication unit; if the voltage digital value is not lower than the alarm threshold value, the current electric quantity data are sent to the cloud platform through the wireless communication unit; and 4) the cloud platform turns on the undervoltage alarm mechanism after receiving undervoltage state information, so as to inform the user or the parking lot management personnel to conduct maintenance and mark the parking lock in an undervoltage state.

In the present embodiment, another implementation mode of the electric quantity monitoring unit is to linearly reduce the battery voltage through the voltage division resistor or directly send the battery voltage to a voltage comparator (including a low voltage detection LVD IC) for comparison, and then send a high or low level including a comparison result to the I/O port of the micro controller. The micro controller judges low and high states of the electric quantity of the parking lock by reading a level state of the I/O port.

Figure 6:
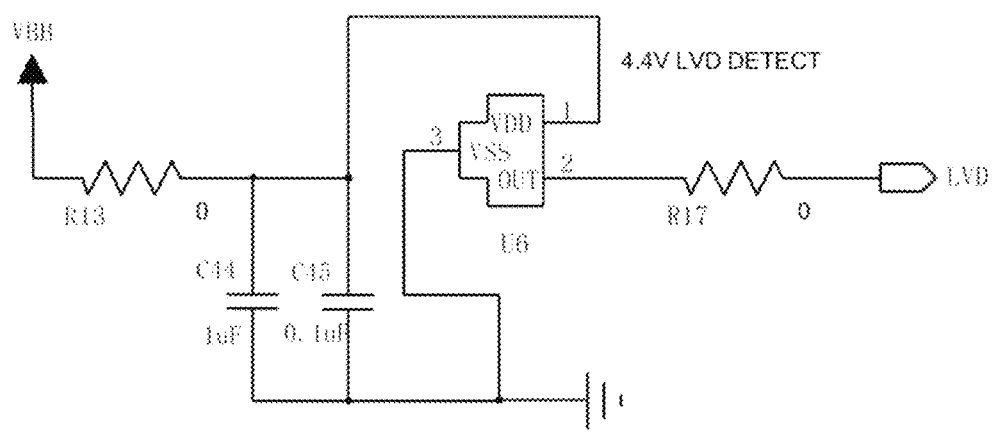
FIG. 6 is an implementation schematic diagram of a second electric quantity monitoring unit in a specific implementation mode of an intelligent parking lock control system.

FIG. 6 shows an implementation schematic diagram of another electric quantity monitoring unit in the contents of the present invention. A farther description is made below in combination with FIG. 6:

1) the battery voltage VBB is linearly reduced through R13, and then is sent to the low voltage detection LVD IC U6 for comparison with a threshold voltage of U6;

2) when the battery VBB input voltage is lower than an, action threshold value of U6, an output of the IC is turned from the original high level into a low level, and this low level, is output from the third pin of the IC, and is sent to the 110 port of the micro controller through R7 and a network LVD; and 3) the micro controller reads the level state of the I/O port, and identifies the battery voltage.

In the present embodiment, the anti-damage detection unit connects a micro motion sensor (including, but not limited to, a ball switch, a micro switch and a G-sensor (gravity sensor)) to the I/O port of the micro controller; when the parking lock is damaged by an external force or is collided by a vehicle by accident, the sensor in the detection unit senses a vibration and/or a position offset generated thereby and then generates a level change; the micro controller reads these varying levels, through the I/O port to acquire state information, then switches on the voice unit to sound an alarm, and reports alarm state information to the cloud platform through the wireless communication unit.

Figure 7:
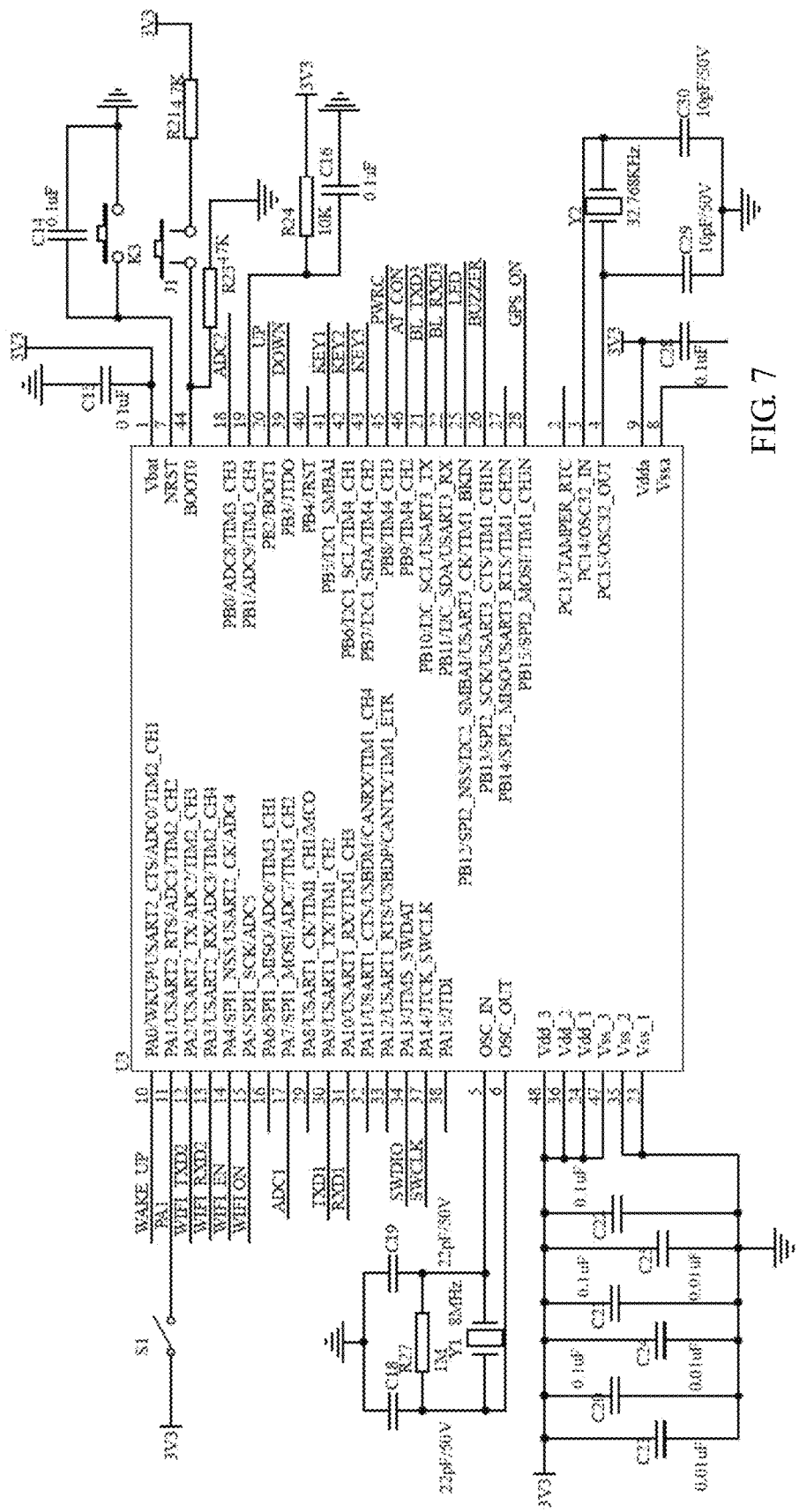
FIG. 7 is an implementation schematic diagram of connection between an anti-damage detection unit and a micro controller in a specific implementation mode of an intelligent parking lock control system.

FIG. 7 shows an implementation schematic diagram of connection between the anti-damage detection unit and the micro controller in the contents of the present invention. A further description is made below in combination with FIG. 7:

1), S1 in the figure is a ball switch. One end of the ball switch is connected to the anode of a system power supply, and the other end of the ball switch is connected to the I/O port PA1 of the micro controller. The I/O port PA1 o is set as internal pull down. When the parking lock, is damaged by the external force or is collided by the vehicle, the vibration and/or the position offset is generated, resulting in connection and disconnection of a switch S1 in the detection unit and generation of low and high varying levels on the I/O port PA1 of the micro controller. The micro controller reads the state of the port PA1 to read the state of the sensor;

2), the micro controller switches on the voice unit to sound an alarm after receiving these pieces of varying state information, and sends alarm state information to the cloud platform through the wireless communication unit; and 3), the cloud platform turns on an alarm mechanism (such as turning on cameras in the parking lot to take videos and informing the user and the parking lot management personnel) after receiving these pieces of alarm information, thereby effectively supervising the parking lock.

In the present embodiment, the low energy power unit consists of a low energy linear voltage stabilizer and a peripheral circuit, and provides a stable working voltage for the whole system. The low energy linear voltage stabilizer has extremely low standby static current when the system is in the dormant state.

Figure 8:
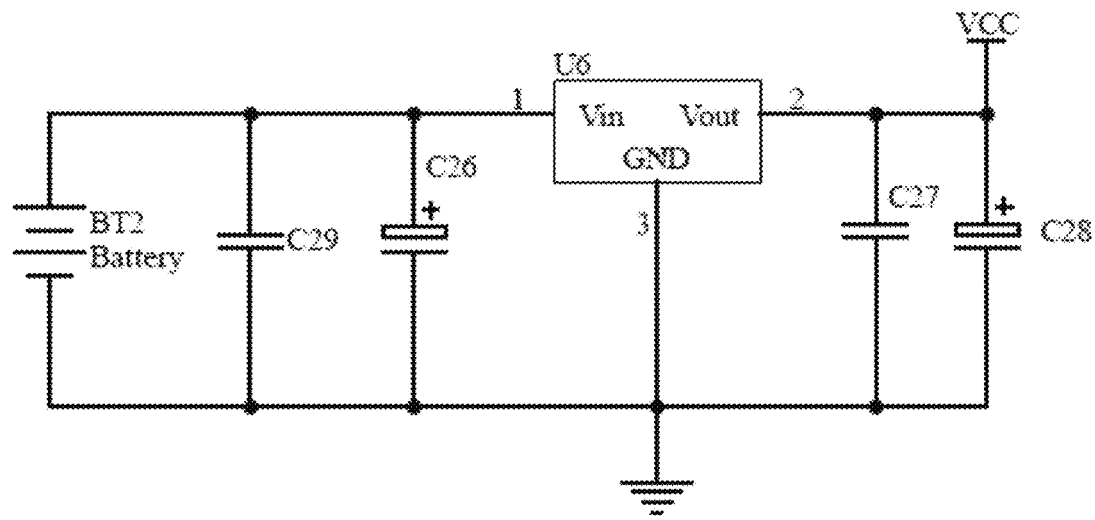
FIG. 8 is an implementation schematic diagram of a first low energy power unit in a specific implementation mode of an intelligent parking lock control system.

FIG. 8 shows an implementation schematic diagram of a lower energy power unit in the contents of the present invention. A further description is made below in combination with FIG. 8:

U6 in the figure is a low energy linear voltage stabilizer IC, BT2 is a battery, and C26 and C29 are energy storage and filter capacitors at the input end of IC. The battery voltage passes through C26 and C29, and then is sent into the input end of U6. U6 has low energy and extremely low standby static current, and outputs a stable voltage from the output, end. After the stable voltage passes through energy storage and filter capacitors C27 and C28 at the output end, a stable working voltage VCC is provided for the whole system. The power management unit also provides low energy physical implementation for the whole control system in, the standby state.

In the present embodiment, according to another implementation mode, the low energy power unit consists of a DC/DC conversion IC with extremely high electric energy conversion efficiency and a peripheral component, and the low energy power unit has a high-efficiency voltage conversion function when the system is in a working state, and provides a required stable working voltage for the system.

Figure 9:
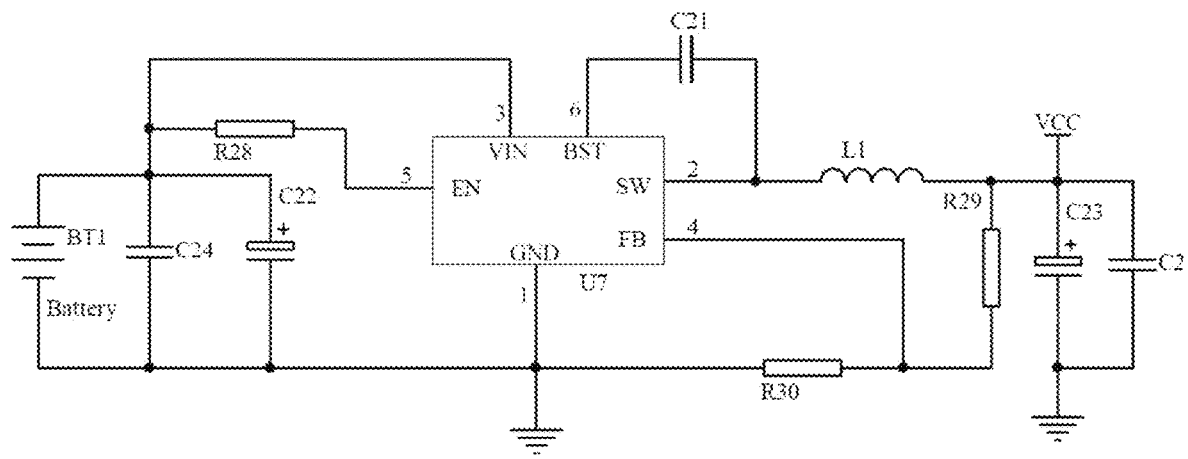
FIG. 9 is an implementation schematic diagram of a second low energy power unit in a specific implementation mode of an intelligent parking lock control system.

FIG. 9 shows an implementation schematic diagram of another low energy power unit in the contents of the present invention. A further description is made below in combination with FIG. 9:

U7 in the figure is a DC/DC IC, BT1 is a battery, and C22 and C24 are energy storage and filter capacitors at the input end of U7. The battery voltage passes through C22 and C24, and then is sent into the input end of U7. The enable end of IC is connected to the positive end of the battery through a resistor R28, so that U7 with electricity may work normally. L1 is an energy storage inductor matched with an internal oscillation circuit of U7, so that conversion of electric energy of the whole DC/DC is realized. By feedbacks for the output voltage by R29 and R30, a stable working voltage VCC is provided for the whole system, and C23 and C25 are energy storage and filter capacitors at the output end of U7. Although, the standby current of DC/DC is slightly higher than that of the lower energy linear voltage stabilizer, the DC/DC is extremely high in electric energy conversion efficiency, so that the electric energy utilization efficiency is greatly improved under the working state of the parking lock system, and the effect of prolonging the service life of the battery is, achieved.

In the present embodiment, the parking lock driving unit is connected with the micro controller and a driving motor in the mechanical transmission mechanism. The parking lock driving unit controls the motor to work to drive the mechanical transmission mechanism and the lifting device, and is an action execution mechanism for unlocking and locking the parking lock.

The parking lock driving unit is characterized by being internally provided with a current sampling resistor connected in series with a motor, so that the micro controller not only controls the parking lock driving unit to realize clockwise rotation, anticlockwise rotation and stop of the motor, but also detects the working current of the motor in real time, and turns on a parking lock anti-collision protection mechanism according to detected suddenly changed current information.

Figure 10:
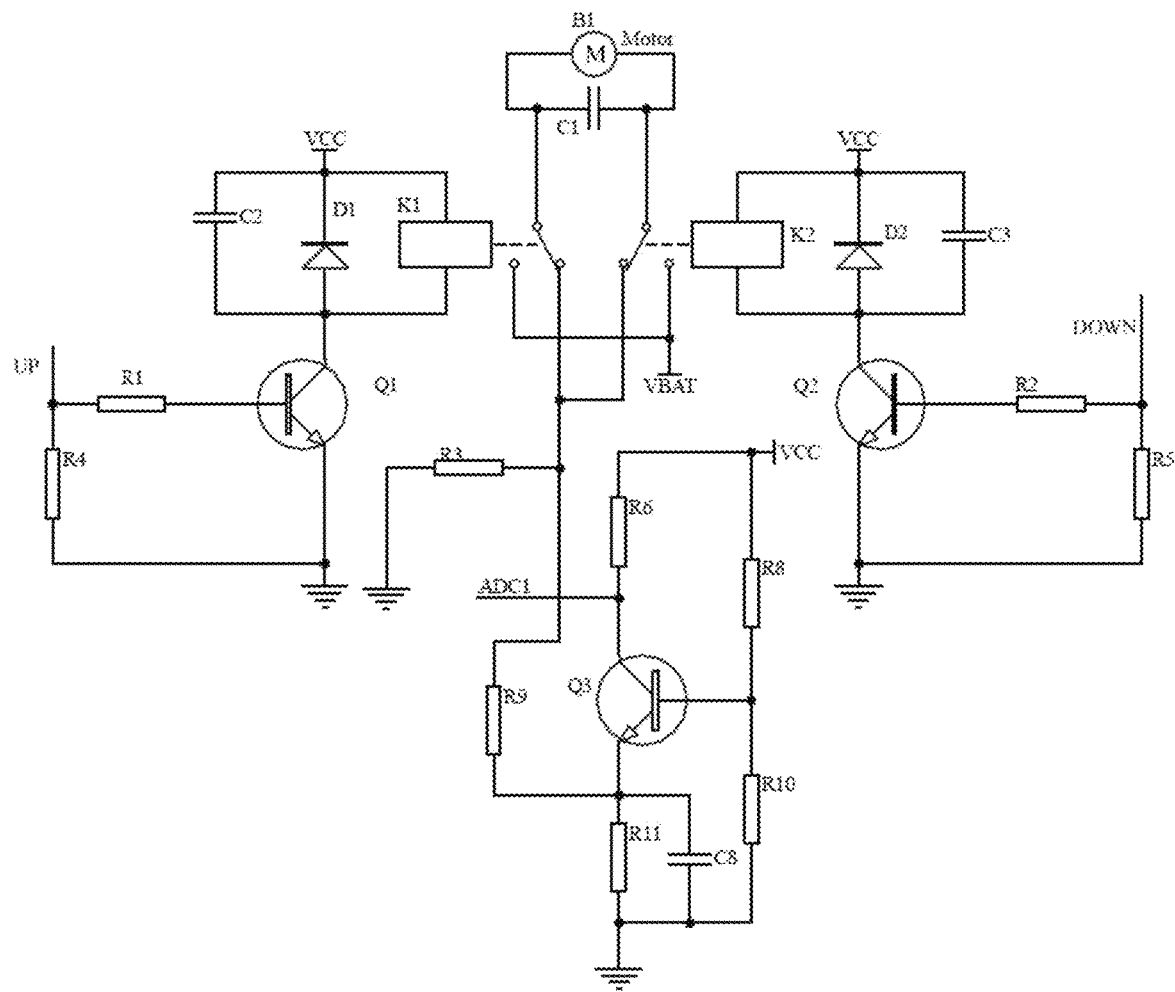
FIG. 10 is an implementation schematic diagram of a first parking lock driving unit in a specific, implementation mode of an intelligent parking lock control system.
Figure 11:
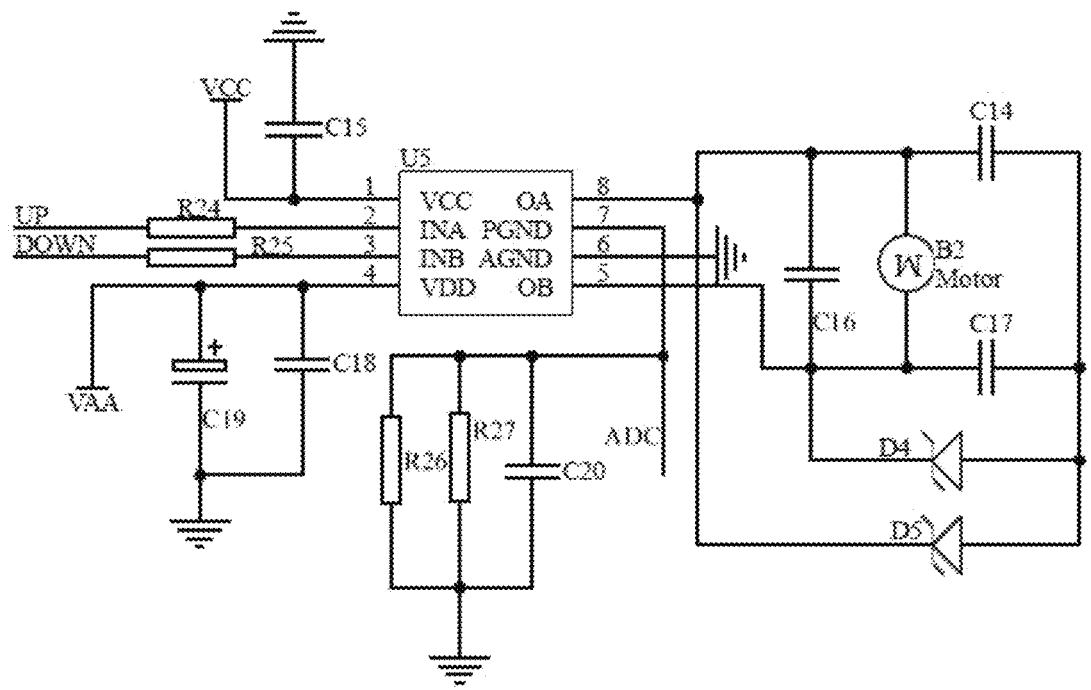
FIG. 11 is an implementation schematic diagram of a second parking lock driving unit in a specific implementation mode of an intelligent parking lock control system.

Mode I of the present embodiment:

FIG. 10 shows an implementation schematic diagram of one parking lock driving unit in the contents of the present invention. A further description is made below in combination with FIG. 10:

1), the micro controller outputs a high level from the UP end and outputs a low level from the DOWN end; when the UP end outputs the high level, a triode Q1 is conducted in a saturated manner, so as to switch on a relay K1; the public end and the normally-open end of K1 are communicated; the battery voltage anode VBAT is applied to a left terminal of the motor B1 through the normally-open end and the public end of the relay K1;

2), meanwhile, when the DOWN end outputs the low level, a triode Q2 is in an off state, so that a relay K2 is in a switched off state, and public contact and normally-closed contact are communicated; a right terminal of the motor is connected to the cathode (JN) of the battery through the public end and the normally-closed end and of the relay K2 and a resistor R3, thereby forming a closed current loop;

3), in this loop, the resistor R3 is connected in series with the motor, so that when the motor rotates to drive the lifting device of the parking lock to do unlocking action, R3 samples the working current of the motor;

4), when the motor drives the lifting device of the parking lock to move, in case of an external force (such as collision by a vehicle) during the movement, the current in the loop is increased to enable the voltage on the sampling resistor R3 to rise up; the voltage on R3 is sent to the e electrode of a triode Q3 through a resistor R9, so that the voltage Ve of the triode rises up, resulting in reduction of the voltage Vbe of the triode; then the triode Q3 enters an amplified state from the original saturated conduction state, namely the voltage of the collector electrode C rises up, and forwardly follows the working current of the motor B1;

5), the collector electrode C of Q3 is connected to the input end ADC1 of the ADC module of the micro controller, and the micro controller samples the voltage and conducts analog-digital conversion through the internal ADC circuit;

6), the micro controller reads data obtained by the analog-digital conversion, and compares the data with a threshold value; if the data is greater than the threshold value, it indicates that the motion of the lifting device is blocked;

7), when the motion is blocked, the micro controller controls the motor to stop rotating or to rotate reversely, so as to achieve an effect of protecting the parking lock or the vehicle;

Mode II of the present embodiment:

FIG. 11 shows an implementation schematic diagram of another parking lock driving unit in the contents of the present invention. A further description is made below in combination with FIG. 11:

1), in this mode, a special motor is adopted to drive the IC U5, which replaces a driving circuit consisting of a triode and a relay in FIG. 8. VCC in the figure provides a rated working voltage for a logic control unit of the IC, and VAA provides a rated working voltage for a motor driving circuit in the IC and the motor;

2), when a high level is applied to the control port "UP" of the IC U5, and a low level is, applied to the control port "DOWN" of the IC U5, the end OA of the IC U5 outputs the high level, and the end OB outputs the low level; the battery voltage anode reaches the upper end of the motor B2 through VAA and the control circuit in the IC, then reaches the lower end of the motor B2 and the end OB of the IC, reaches the end PGND from the inside of the IC, and reaches the battery voltage cathode GNB through related resistors R26 and R27, thereby forming a closed current loop; the motor rotates clockwise to drive the lifting device to complete the unlocking action; on the contrary, when a low level is applied to the control port "UP" of the IC U5, and a high level is applied to the control port "DOWN" of the IC U5, the motor rotates anticlockwise to complete the locking action;

3), D4 and D5 in, the figure may eliminate extremely high reverse electromotive force generated by a motor coil at the moment that the motor stops, and C14, C16 and C17 may eliminate electromagnetic interference generated by reversing of an electric brush of the motor;

4), it can be seen from the above that R26 and R27 in the circuit are connected in parallel, and then are connected in series with the motor B2, so as to be in the same working loop, so that the current of the working loop generates a voltage ADC in direct proportion to the current of the loop on the parallel-connected resistors R26 and R27 after flowing through the motor and the parallel-connected resistors R26 and R27; then the voltage is sent to the input ADC1 of the ADC module of the micro controller, so that the micro controller completes sampling of the current of the motor;

5), the micro controller samples this voltage, and conducts analog-digital conversion through the internal ADC circuit;

6), the micro controller reads data obtained by the analog-digital conversion, and compares the data with a threshold value; if the data is greater than the threshold value, it indicates that the motion of the lifting device is blocked;

7), when the motion is blocked, the micro controller controls the motor to stop rotating or to rotate reversely, so as to achieve an effect of protecting the parking lock or the vehicle;

In the present embodiment, the mechanical position sensor is arranged on the mechanical transmission mechanism, is connected with the low energy power unit and the micro controller, and is a detection mechanism for completion of unlocking and locking actions of the parking lock. The mechanical position sensor includes, but not limited to, a photoelectric switch and a micro switch. The micro controller detects on and off states of the sensor connected to the IO port to detect whether the lifting device completes unlocking and locking action detection.

Figure 12:
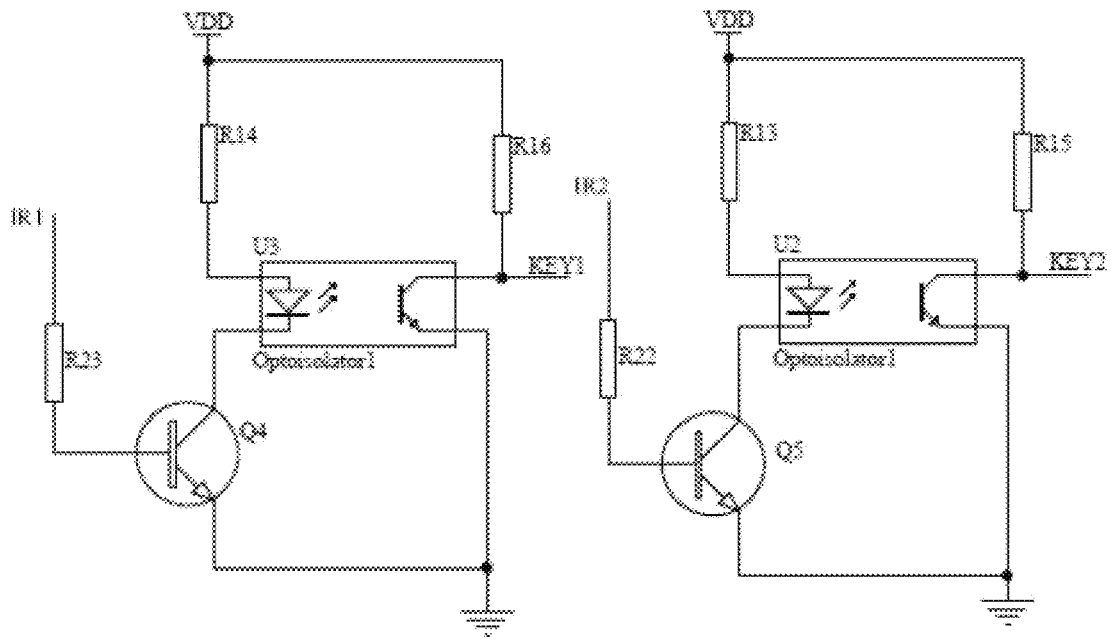
FIG. 12 is an implementation schematic diagram of a first mechanical position sensor in a specific implementation mode of an intelligent parking lock control system.

Mode I of the present embodiment:

FIG. 12 shows an implementation schematic diagram of one mechanical position sensor in the contents of the present invention. A further description is made below in combination with FIG. 12:

1) the mechanical position sensor is formed by connecting two pairs of photoelectric switches U2 and U3 arranged on the lifting device to the I/O ports of the micro controller;

2) the micro controller controls low and high level states of the IO ports IR1 and IR2 to achieve the effect of controlling emission to be turned on when, the motor works and turned off when the circuit is dormant, thereby fulfilling the aim of saving power;

3) when the motor works, the micro controller outputs high levels from IR1 and IR2, switch triodes Q4 and Q5 are conducted in a saturated manner, and power VDD is applied to emitting diodes of the photoelectric switches U2 and U3 through current limiting resistors R13 and R14 to emit infrared lights; receiving photosensitive triodes of the photoelectric switches U2 and U3 may enable the collector electrodes C KEY2 and KEY1 to become low levels when sensing the infrared lights emitted by the emitting diodes, and similarly, may enable KEY2 and KEY1 to become high levels when not sensing the infrared light emitted by the emitting diodes;

4) when the lifting device is located at the middle position without completing unlocking and locking, a mechanical shading piece on the lifting device shades the infrared light emitted by the photoelectric switch U3 to enable KEY1 to become the high level, and does not shade the infrared light emitted by the photoelectric switch U2 to enable KEY2 to become the low level;

5) when unlocking is completed, the infrared lights emitted, by the emitting diodes of the photoelectric switches U2 and U3 are both not shaded by the mechanical shading piece on the lifting device, so that KEY1 and KEY2 both become the low levels;

6) when locking is completed, the infrared lights emitted by the emitting diodes of the photoelectric switches U2 and U3 are both shaded by the mechanical shading piece on the lifting device, so that KEY1 and KEY2 both become the high levels; and 7) the micro controller may control the parking lock driving unit to complete the accurate unlocking and locking actions when detecting these state changes of the IO ports IOA1 and IOA2.

Figure 13:
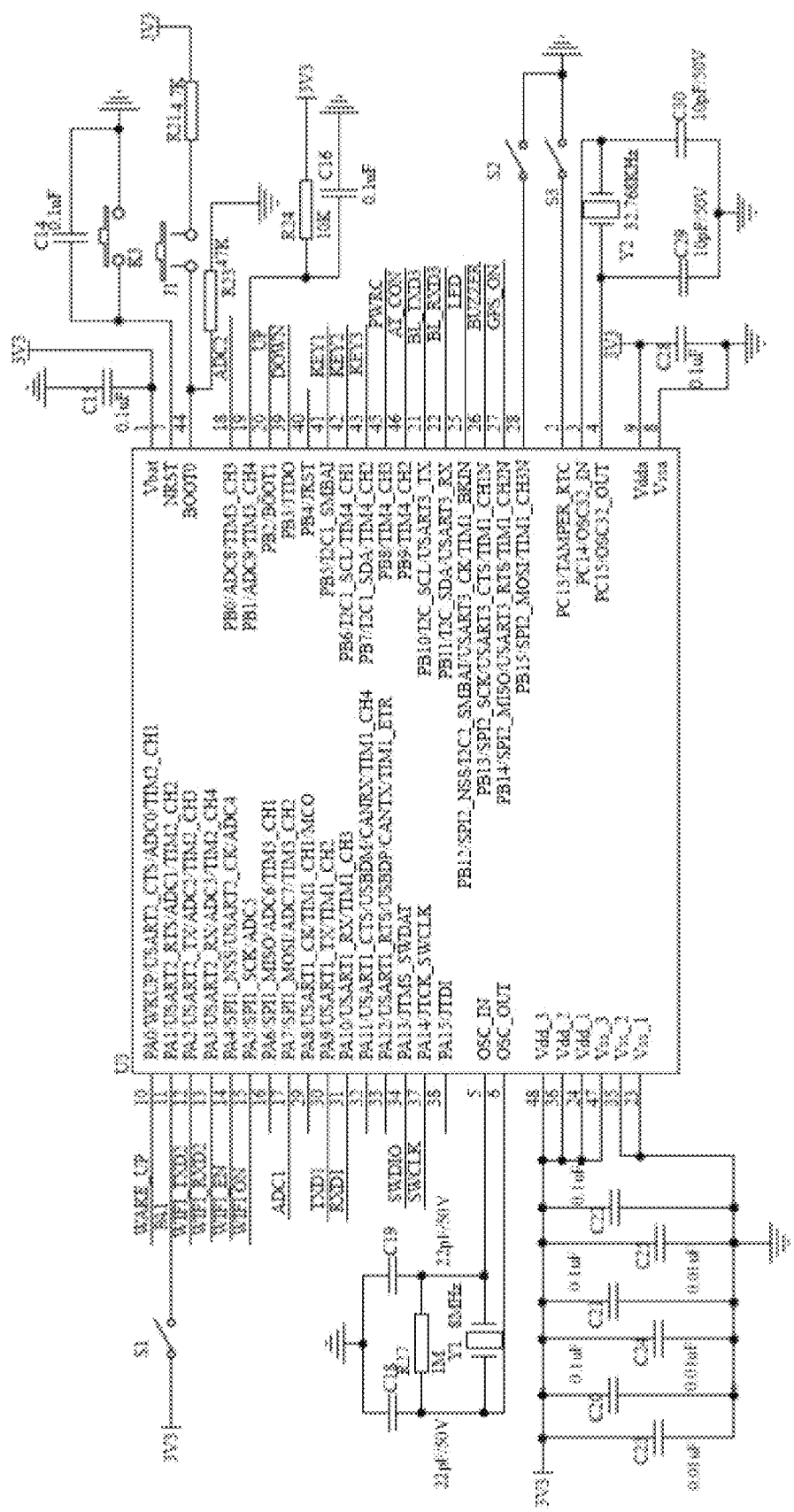
FIG. 13 is an implementation schematic diagram of a second mechanical position sensor in a specific implementation mode of an intelligent parking lock control system.

Mode II of the present embodiment:

FIG. 13 shows an implementation schematic diagram of another mechanical position sensor in the contents of the present invention. A further description is made below in combination with FIG. 13:

1) the mechanical position sensor is formed by connecting 2 micro switches S2 and S3 arranged on the lifting device to the I/O ports PB15 and PC13 of the micro controller U3;

2) when the lifting device is located at the middle position without completing unlocking and locking, the micro switches S2 and S3 are both in switched off states, and the I/O ports PB14 and PC13 of the micro controller U3 are high levels;

3) when unlocking is completed, a mechanical component on the lifting device enables the micro switch S2 to be switched on, so that the I/O port PB15 connected with the micro switch S2 becomes a low level;

4) when locking is completed, the mechanical component on the lifting device enables the micro switch S3 to be switched on, so that the I/O port PC13 connected with the micro switch S3 becomes a low level; and 5) the micro controller may control the parking lock driving unit to complete the accurate unlocking and locking actions when detecting these state changes of the IO ports PB15 and PC13.

The parking space sharing method of the present invention is further described below.

Figure 14:
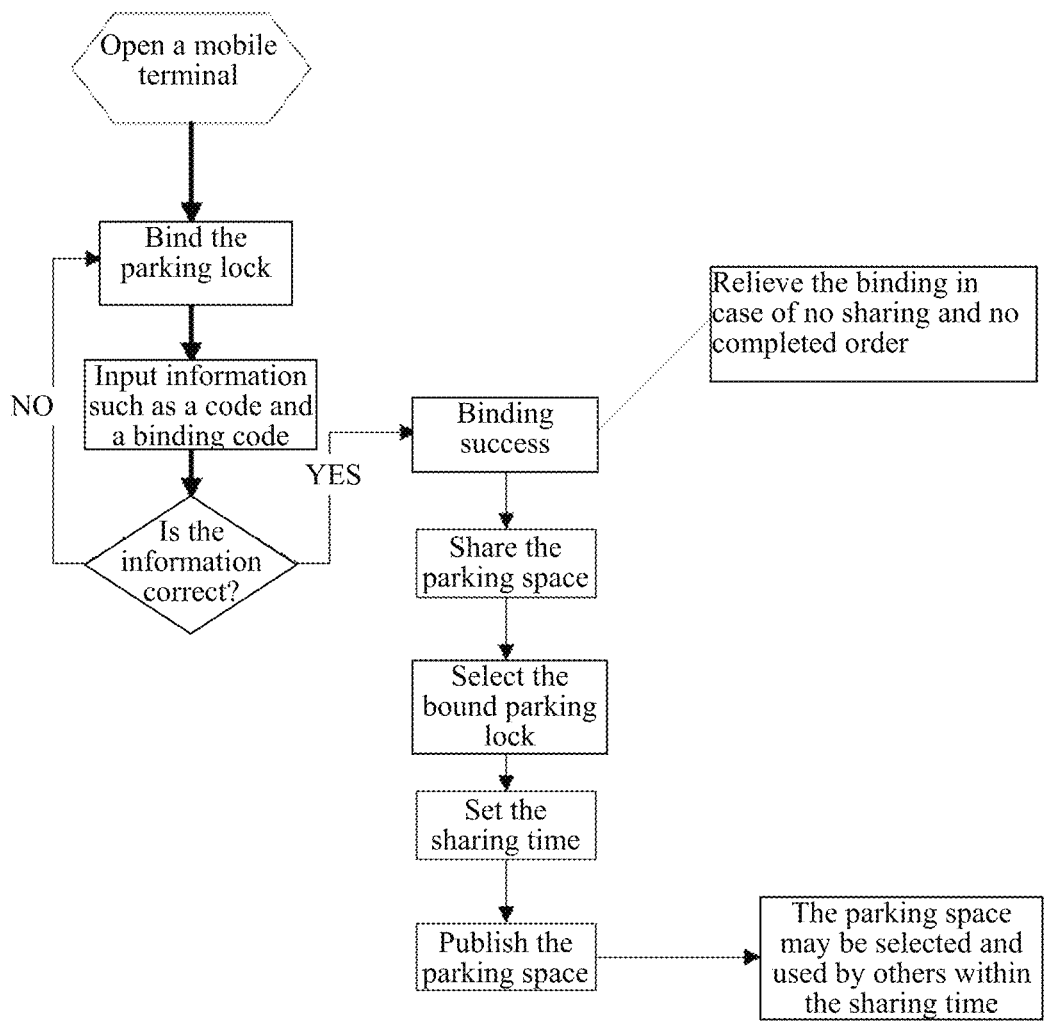
FIG. 14 is a flowchart of binding and sharing of a parking lock.
Figure 15:
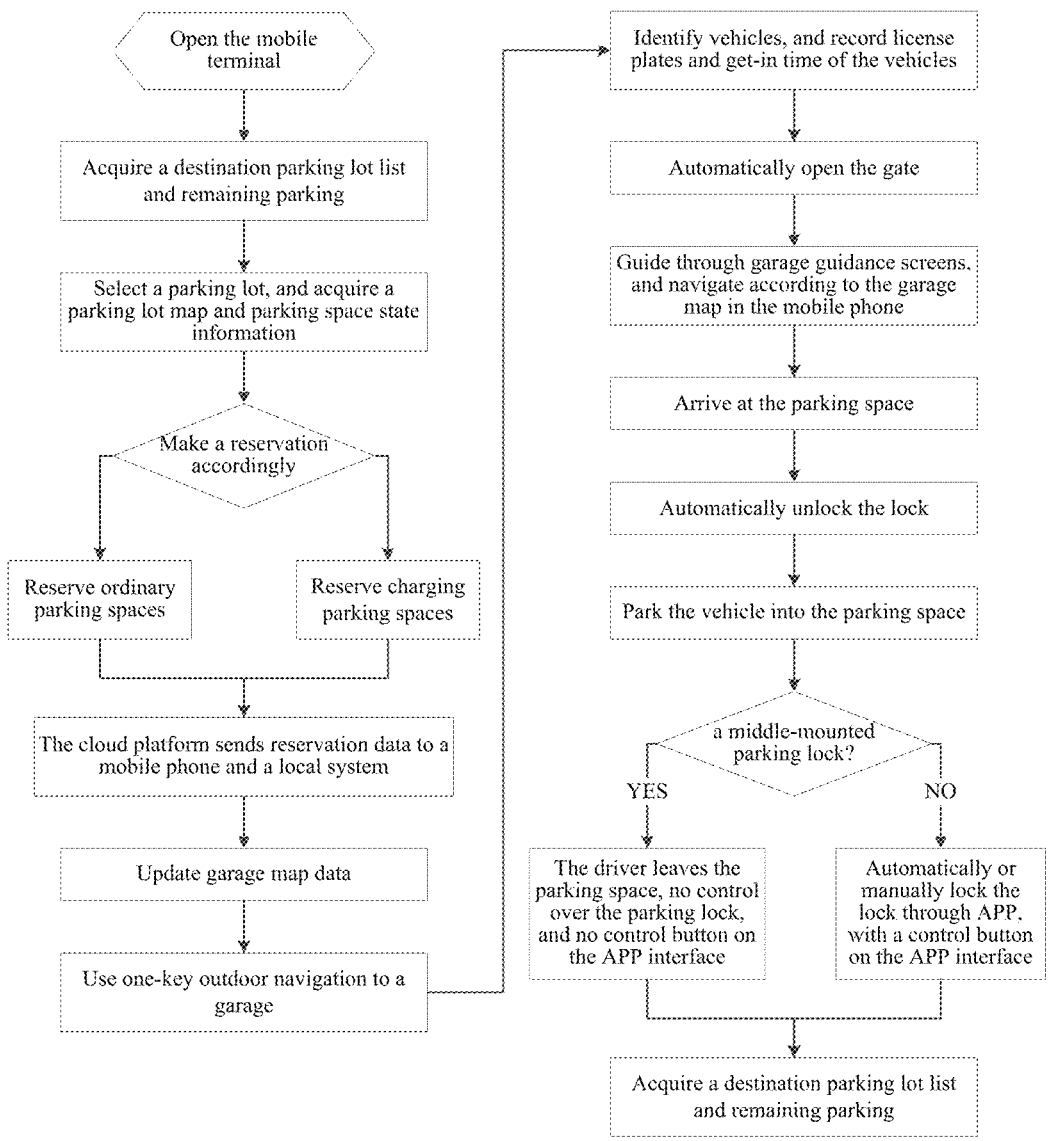
FIG. 15 is a flowchart of the way for a user who has made a reservation to use a parking space.
Figure 16:
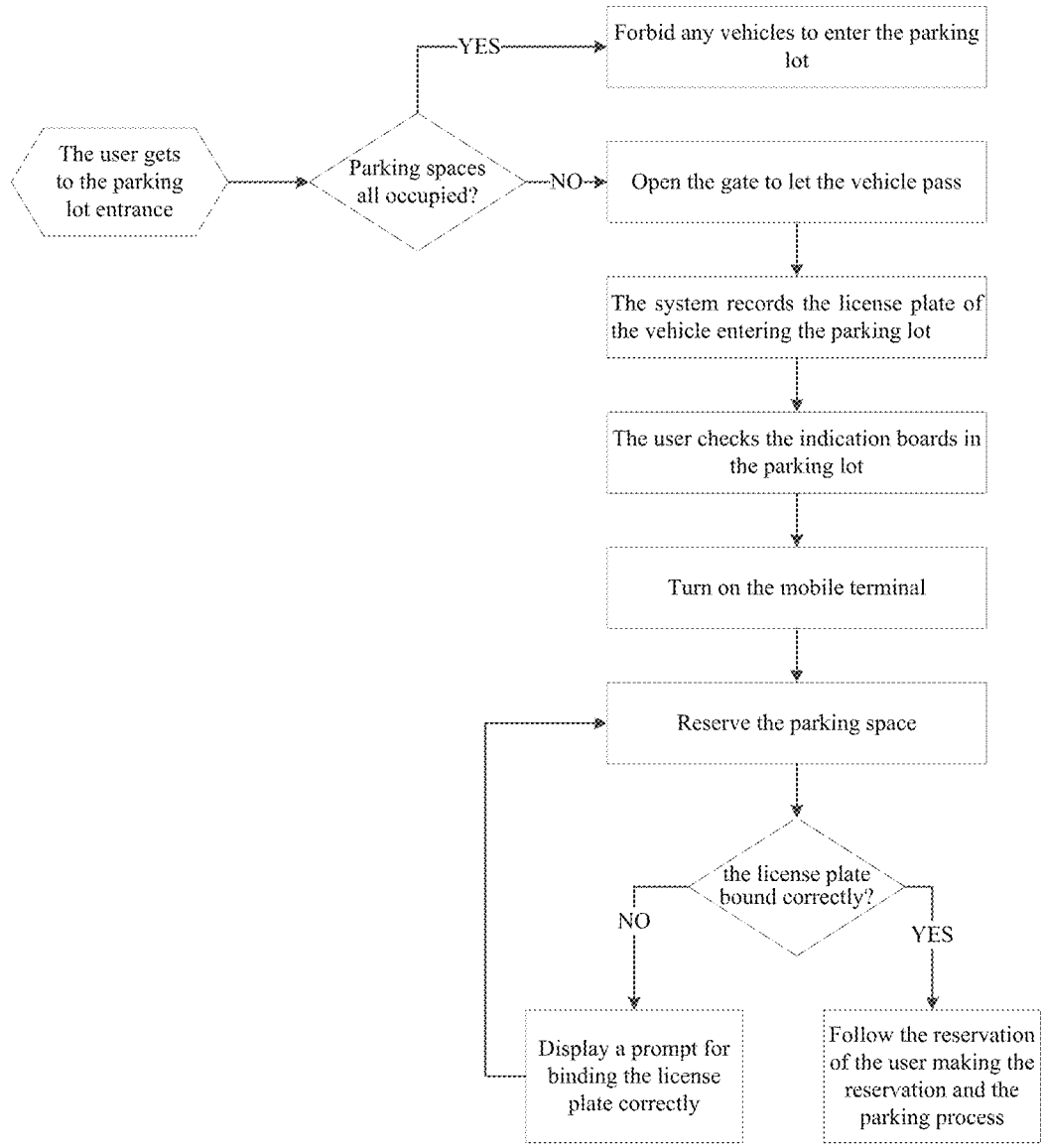
FIG. 16 is a flowchart of the way for a temporary vehicle to use a parking space.
Figure 17:
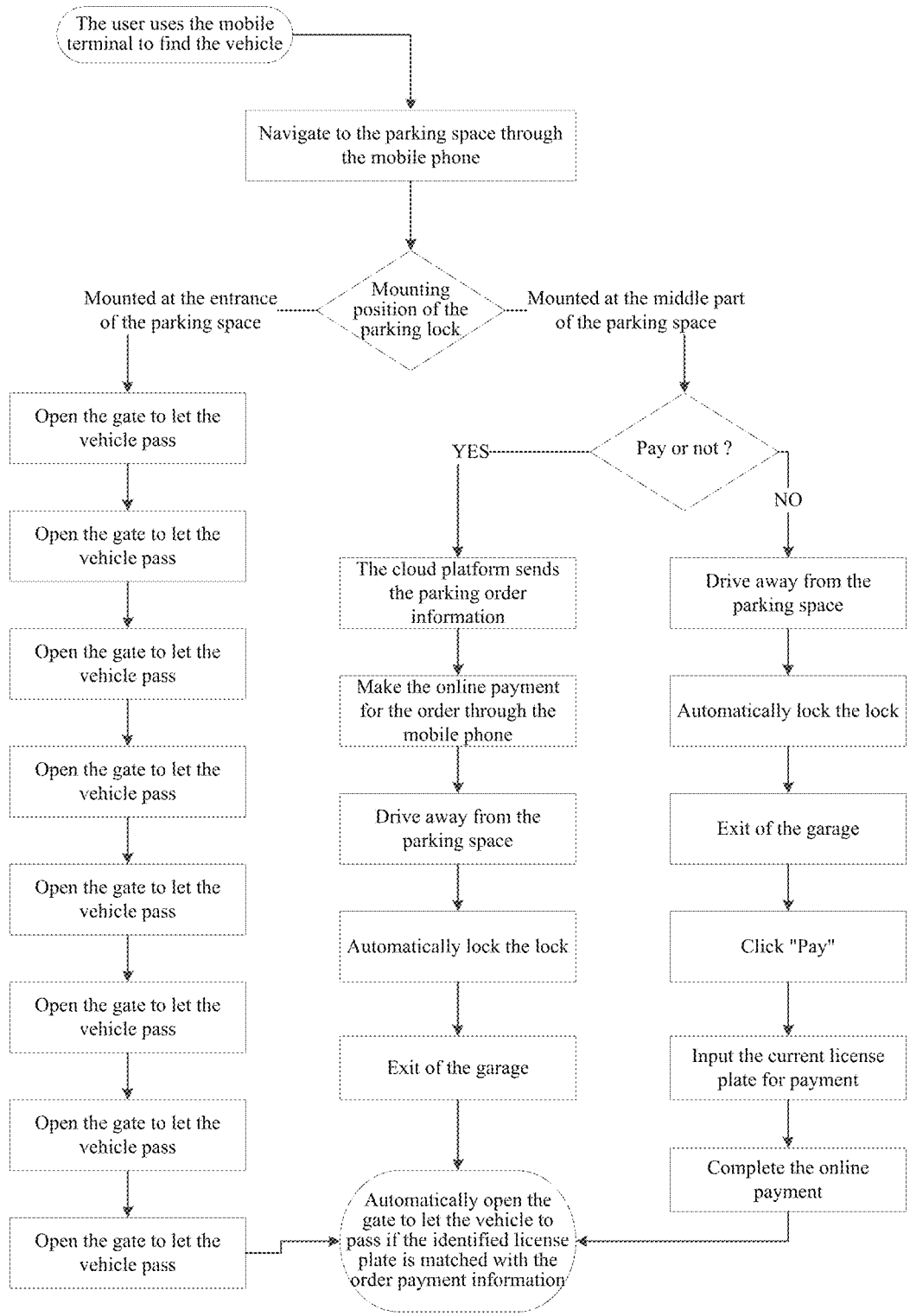
FIG. 17 shows a way for a user to find a vehicle reversely and drive the vehicle away.

The parking space sharing method of the present invention includes (1) binding of a parking lock (FIG. 14). (2) sharing of a parking space (FIG. 14), (3) the way for a user who has made a reservation to use the parking space (FIG. 15), (4) the way for a temporary vehicle to use the parking space (FIG. 16), (5) the way for the user to find a vehicle reversely and drive the vehicle away from a garage (FIG. 17), and (6) fault-tolerance processing during use. Steps of each process are as follows:

the process (1) of binding of the parking lock includes the following steps:

1.1) the user connects the mobile terminal to the Internet;

1.2) the user searches and follows a Weehat official account or uses an applet of Wechat or installs an APP;

1.3) the user enters a parking lock binding menu of the Wechat official account or the applet of Wechat or the APP;

1.4) the user types in a parking lock code and a parking lock binding code into the parking lock binding menu of the Wechat official account or the applet of Wechat or the APP;

1.5) if the user types in the correct parking lock code and parking lock binding code, it indicates binding success, and if the user types in the wrong correct parking lock code and parking lock binding code, it indicates corresponding error information;

1.6) after, binding the parking lock, the user can unlock and lock the own parking lock instantly through the Wechat official account or the applet of Wechat or the APP;

1.7) after the user binds the parking lock, the cloud platform stores latest position information of the parking lock;

1.8) the parking lock may be bound by multiple users, but only controlled by one user within the same time.

the process (2) of sharing of the parking space includes the following steps:

2.1) after binding the parking lock successfully, the user enters a parking space sharing menu through the Wechat official account or the applet of Wechat or the APP;

2.2) the parking lock which is not shared by the current user at the present may be shared in the parking space sharing menu;

2.3) a time period for sharing the parking lock is set in the parking space sharing menu;

2.4) the user can set a daily fixed time period for automatic sharing at one time, and also can set a specific time period for sharing;

2.5) after the time period is set, the user confirms and submits data;

2.6) the cloud platform stores, analyzes and verifies the data submitted b the user;

2.7) the cloud platform sends a message indicating sharing setting success to the mobile terminal of the user;

2.8) the cloud platform forbids the user to randomly control the own parking lock to be unlocked and locked within the sharing time period set by the user;

2.9) within the sharing time period set by the user, if the parking space is not reserved and no real-time order is produced, the user can cancel the parking space sharing through the Wechat official account or the applet of Wechat or the APP;

2.10) the user can manage the own parking lot at any time after canceling the parking space sharing;

2.11) within the sharing time period set by the user, the current parking space may be reserved by other users through the Wechat official account or the applet of Wechat or the APP.

the process (3) that a user who has made a reservation uses the parking space includes the following steps:

3.1) the user connects the mobile terminal to the Internet to enter the Wechat official account or the applet of Wechat or the APP;

3.2) the user types in a parking destination, and checks detailed information such as a list of parking lots near the destination, and the number of remaining parking spaces;

3.3) the user selects parking spaces to be reserved on a garage map of the parking lot to reserve a parking space;

3.4) the system automatically calculates a prepaid expense according to a reserved parking space retention rule and a parking expense rule of the current parking lot, and after paying the money successfully, the user submits reservation order information to the cloud platform;

3.5) the cloud platform sends the order information to the parking lot management system, and sends reservation success information and the prompts of turning on the Bluetooth function and the wifi connection function of the mobile terminal to the mobile terminal of the user;

3.6) after making the reservation successfully, the user uses a one-key automatic navigation function to arrive at the entrance of the parking lot;

3.7) a license plate identification device of the parking lot management system matches the reservation order information with license plate information of the current user, so as to automatically open a barrier gate to let the reservation vehicle pass;

3.8) the cloud platform acquires real-time coordinates of the user through Bluetooth equipment arranged at the entrance of the parking lot, and after the user arrives at a place near the garage, the Wechat official account, the applet Wechat or the APP is switched to a garage map interface;

3.9) the cloud platform judges the current, position of the user according to all current surrounding Bluetooth signal IDs scanned by the mobile terminal of the laser and the intensity of each Bluetooth signal, converts the position of the mobile terminal of the user in the map of the parking lot into user real-time coordinates in combination with coordinates of the target parking space and the distance to the target parking space, and conducts route planning and route guidance 3.10) the cloud platform sends a route plan to the Wechat official account, the applet of Wechat or the APP of the user, and sends a route guidance to parking guidance screens in the parking lot at the same time;

3.11) the user checks a route plan track in real time through the Wechat official account, the applet of Wechat or the APP, and navigates to the reserved parking space according to the track;

3.12) the user can also drive to the preserved parking space according to the route guidance on the parking guidance screens in the parking lot;

3.13) when the user reaches a place near the reserved parking space, the cloud platform calculates the user coordinates and a target parking lock ID; furthermore, when the intensity of the Bluetooth signal of the target parking lock ID is equal to an unlocking threshold value, the cloud platform issues an unlocking instruction to the parking lock; after, receiving the unlocking instruction, the parking lock switches on the parking lock driving unit circuit to drive the mechanical transmission mechanism and the lifting device to realize automatic unlocking;

3.14) the parking lock sends state information to the cloud platform in real time for processing and user query;

3.15) the user parks the vehicle.

Figure 18:
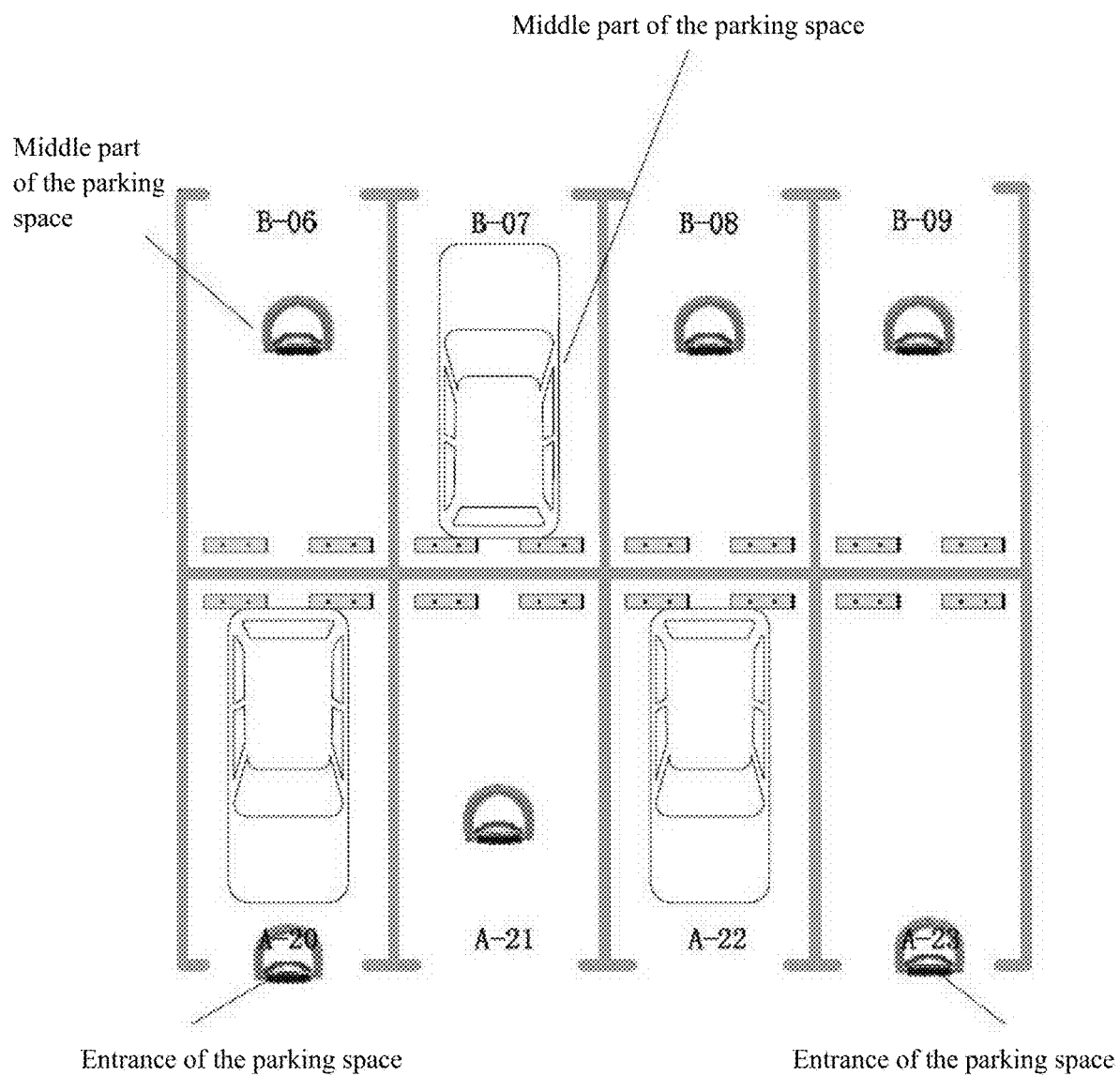
FIG. 18 is a schematic diagram of an installation position of a parking lock.

At the moment, as shown in FIG. 18, according to different parking lock installation positions of different parking lots, there are two situations:

I. when each intelligent parking lot in one parking lot is installed at the entrance of each parking space, the process includes the following steps:

3.16) when each intelligent parking lot in the parking lot is installed at the entrance of each parking space, and when the mobile terminal is not near the parking lock, and scans no Bluetooth signal including the parking lock ID or the intensity of the scanned signal is lower than the threshold value, the cloud platform issues a locking instruction to the parking lock, and at the moment, the parking lock automatically rises up to complete locking, and sends parking lock state information to the cloud platform;

3.17) when the mobile terminal is near the parking lock all the time, if the intensity of the Bluetooth signal including the parking lock ID, scanned by the mobile terminal, lasts for a time greater than a set normal parking time threshold value, the cloud platform sends alarm signals to the parking lock and the mobile terminal at the same time, and issues a locking instruction to the parking lock, and the parking lock automatically rises up to complete locking, and sends parking lock state information to the cloud platform in real time;

3.18) after parking the vehicle, the user can send a locking request to the cloud platform on the mobile terminal through the Wechat official account, the applet of Wechat or the APP, and at the moment, the cloud platform issues a locking instruction to the parking lock after receiving the user request, and the parking lock automatically rises up to complete locking.

II. When each intelligent parking lock in one parking lot is installed at the middle part of each parking space, the process includes the following steps:

3.19) when each intelligent parking lock in the parking lot is installed at the middle part of each parking space, if the mobile terminal is not near the vehicle, the parking lock would not automatically rise up;

3.20) when the mobile terminal is near the parking lock all the time, if the intensity of the Bluetooth signal including the parking lock ID, scanned by the mobile terminal, lasts for a time greater than a set normal parking time threshold value, the cloud platform sends an alarm signal, but would not issue a locking instruction, and the parking lock sends real-time state information to the cloud platform;

3.21) after the user parks the vehicle on the parking space with this parking lock, no locking operation entrance is displayed on the mobile terminal.

The process (4) that a temporary vehicle uses a parking space includes the following steps:

4.1) the vehicle reaches the entrance of the parking lot;

4.2) a display screen at the entrance displays the number of remaining parking spaces; if all the parking spaces in the garage are occupied, the barrier gate is not opened, so as to forbid the vehicle to enter;

4.3) if there are still parking spaces unoccupied in the garage, the barrier gate is automatically opened to allow the vehicle to enter;

4.4) drivers intending to park the vehicles temporarily can check clear parking method indication boards arranged at the entrance and exit as well as many places in the parking lot to know how to normally unlock the parking lots and park the vehicles;

4.5) the user searches and successfully follows the Wechat official account or scans the applet of Wechat with the mobile terminal according to the guidance;

4.6) the user clicks into the Wechat official account or the applet of Wechat;

4.7) the user uses a parking space reservation function menu;

4.8) the user selects parking spaces to be reserved to reserve available parking spaces;

4.9) the system automatically calculates a prepaid expense according to the reserved parking space retention rule and the parking expense rule of the current parking lot; after paying the money successfully, the user submits reservation order information to the cloud platform;

4.10) the cloud platform sends the order information to the parking lot management system, sends reservation success information and the prompts of turning on the Bluetooth function and the Wifi connection function of the mobile terminal to the mobile terminal of the user;

4.11) the cloud platform acquires real-time coordinates of the user, and after the user arrives at a place near the garage, the Wechat official account, the applet of Wechat or the APP is switched to a garage map interface;

4.12) the cloud platform judges the current position of the user according to all the current surrounding broadcast IDs scanned by the mobile terminal of the user and the intensity of each Bluetooth signal, converts the position of the mobile terminal of the user in the map of the parking lot into user real-time coordinates in combination with coordinates of a target parking space and the distance to the target parking space, and conducts route planning and route guidance;

4.13) the cloud platform sends a route plan to the Wechat official account, the applet of Wechat or the APP of the user, and sends a route guidance to parking guidance screens in the parking lot at the same time;

4.14) the user checks a route plan track in real time through the Wechat official account, the applet of Wechat or the APP, and navigates to the reserved parking space according to the track;

4.15) the user also can drive to the preserved parking space according to the route guidance on the parking guidance screens in the parking lot;

18) when the user reaches the place near the reserved parking space, and at the moment, the user coordinates and, the intensity of the Bluetooth signal including the target parking lock ID are equal to an unlocking threshold value, the cloud platform issues an unlocking instruction to the parking lock; after receiving the unlocking instruction, the parking lock switches on the parking lock driving unit circuit to drive the mechanical transmission mechanism and the lifting device to realize automatic unlocking;

4.16) the parking lock sends state information to the cloud platform in real time for processing and user query;

4.17) the user parks the vehicle.

Then, as shown in FIG. 18, according to different parking lock installation positions of different parking lots, there are two situations:

I. when each intelligent parking lock in one parking lot is installed at the entrance of each parking space, the process includes the following steps:

4.18) when each intelligent parking lock in the parking lot is installed at the entrance of each parking space, if the mobile terminal is not near the parking lock, and scans no Bluetooth signal including the parking lock ID or the intensity of the scanned signal is lower than a threshold value, the cloud platform issues a locking instruction to the parking lock, and at the moment, the parking lock automatically rises up to complete locking and sends state info enation to the cloud platform;

4.19) when the mobile terminal is near the parking lock all the time, if the intensity of the Bluetooth signal including the parking lock ID, scanned by the mobile terminal, lasts for a time greater than a set normal parking time threshold value, the cloud platform sends alarm signals to the parking lock and the mobile terminal at the same time, and issues a locking instruction to the parking lock, and the parking lock automatically rises up to complete locking, and sends parking lock state information to the cloud platform in real time;

4.20) after parking the vehicle, the user can send a locking request to the cloud platform on the mobile terminal through the Wechat official account, the applet of Wechat or the APP, and at the moment, the cloud platform issues a locking instruction to the parking lock after receiving the user request, and the parking lock automatically rises up to complete locking.

II. When each intelligent parking lock in one parking lot is installed at the middle part of each parking space, the process includes the following steps:

4.21) when each intelligent parking lock in the parking lot is installed at the middle part of each parking space, if the mobile terminal is not near the vehicle, the parking lock, would not automatically rise up;

4.22) when the mobile terminal is near the parking lock all the time, if the intensity of the Bluetooth signal including the parking lock ID, scanned by the mobile terminal, lasts for a time greater than a set normal parking time threshold value, the cloud platform sends an alarm signal, but would not issue a locking instruction, and the parking lock sends real-time state information to the cloud platform;

4.23) after the user parks the vehicle on the parking space with the parking lock installed at the middle part of the parking lock, no locking operation entrance is displayed on the mobile terminal.

The process (5) that a user finds the vehicle reversely and drives the vehicle away from the garage includes the following steps:

I. when each intelligent parking lock in one parking lot is installed at the entrance of each parking space, the process, includes the following steps:

5.1) the user returns to the parking lock, and clicks a one-key-to-find-vehicle button of the Wechat official account, the applet, of Wechat or the APP through the mobile terminal; the wireless communication module of the mobile terminal scans a Bluetooth signal near the user, and sends the scanned Bluetooth signal including the parking lock ID and the intensity of the signal to the cloud platform; the cloud platform immediately plans a vehicle finding route according to user coordinates and parking space coordinates, and, guides the user to walk to the parking space;

5.2) the user clicks an unlocking button in the Wechat official account, the applet of Wechat or the APP on the mobile terminal, and the cloud platform acquires an unlocking request of the user:

5.3) the cloud platform generates order payment information in real time according to actual parking time of the user, and sends the information to the Wechat official account, the applet of Wechat or the APP on the mobile terminal of the user;

5.4) the user uses the mobile terminal to make a payment for the order by using the wallet balance of a cloud platform personal account or in other online payment ways in the Wechat official account, the applet of Wechat or the APP;

5.5) when detecting that the user completes the payment, the cloud platform sends latest order information to the mobile terminal of the user and the parking lot management system, and issues an unlocking instruction to the intelligent parking lock;

5.6) after receiving the unlocking instruction, the intelligent parking lock switches on the parking lock driving unit circuit to drive the mechanical transmission mechanism and the lifting device to automatically lower the parking lock to complete, unlocking, and sends the parking lock state information to the cloud platform;

5.7) the user gets into the vehicle, and prepares to drive the vehicle away from the parking space;

5.8) after the user completes the payment, when the mobile terminal is near the parking lock all the time, if the intensity of the Bluetooth signal including the parking lock ID, scanned by the mobile terminal, lasts for a time greater than a set normal time threshold value, the cloud platform sends alarm signals to the parking lock and the mobile terminal at the same time to remind the user to drive the vehicle away from the parking space as soon as possible;

5.9) when the mobile terminal is not near the parking lock, and cannot scan the Bluetooth broadcast signal including the parking lock ID or the intensity of the scanned signal is lower than the threshold value, the cloud platform issues a locking instruction to the parking lock, and the parking lock switches on the parking lock driving unit to complete locking, and sends parking lock, state information to the cloud platform;

5.10) when the user reaches the exit of the parking lot, the parking lot management system matches the latest order information of the user, and automatically opens the barrier gate to let the vehicle pass;

II. when each intelligent parking lock in one parking lot is installed at the middle part of each parking space, the process includes the following steps:

5.11) the user returns to the parking lock, and clicks a one-key-to-find-vehicle button of the Wechat official account, the applet of Wechat or the APP through the mobile terminal; the wireless communication module of the mobile terminal scans a Bluetooth signal near the user, and sends the scanned Bluetooth signal including the parking lock ID and the intensity of the signal to the cloud platform; the cloud platform immediately plans a vehicle finding route according to user coordinates and parking space coordinates, and guides the user to walk to the parking space;

5.12) at the moment, the user can click order pay through the mobile terminal, so as to leave the parking lot as quickly as possible at the exit of the garage;

5.13) when the user clicks PAY, the cloud platform generates order payment information in real time according to actual parking time of the user, and sends the information to the Wechat official account, the applet of Wechat or the APP on the mobile terminal of the user;

5.14) the user uses the mobile terminal to make a payment for the order by using the wallet balance of a cloud platform personal account or in other online payment ways in the Wechat official account, the applet Wechat or the APP;

5.15) the user gets into the vehicle, and drives the vehicle away from the parking space;

5.16) when the mobile terminal is not near the parking lock, and cannot scan the Bluetooth broadcast signal including the parking lock ID or the intensity of the scanned signal is lower than the threshold value, the cloud platform issues a locking instruction to the parking lock, and the parking lock switches on the parking lock driving unit to complete locking, and sends parking lock state information to the cloud platform;

5.17) when the user reaches the exit of the parking lot, the parking lot management system matches the latest order information of the user;

5.18) if the user has paid the expense, the parking lot management system opens the barrier to let the vehicle pass, and the local management system sends latest state information of the order of the user to the cloud platform;

5.19) if the user has not paid the parking expense before reaching the exit, the barrier gate at the exit of the garage would not be opened;

5.20) at the moment, the parking lot management system at the exit sends non-payment vehicle information and time to the cloud platform;

5.21) the cloud platform generates order payment information in real time according to actual parking time of the user, and sends the information to the Weehat official account, the applet of Wechat or the APP on the mobile terminal of the user;

5.22) the user uses the mobile terminal to make a payment for the order by using the wallet balance of a cloud platform personal account or in other online payment ways in the Wechat official account, the applet of Wechat or the APP;

5.23) when detecting that the user completes the payment, the cloud platform sends latest order information to the mobile terminal of the user and the parking lot management system;

5.24) the parking lot management system matches the latest order information of the user, and automatically opens the barrier gate to let the vehicle pass.

The process (6) of fault-tolerance processing during use includes the following steps:

The parking locks may be correctly bound by multiple users, and meanwhile, one user also can bind and management multiple parking locks.

6.1) if the user who has made a reservation for a parking space does not show up after certain time since the reservation start time, the cloud platform automatically cancels the current reservation order, and indicates the user to remake a reservation;

6.2) if the user pays the expense, but still stays in the parking lot for certain time exceeding the time set by the system, the extra time will be double charged;

6.3) when the parking lot has a bad signal or does not have a network signal, the user can scan a Wechat WWI QR code in the parking lot through the mobile terminal to follow a Wechat official account and click a connect now button on the Wechat official account, and then the user can use the wifi network covering the whole parking lot without typing in wifi account password;

6.4) the parking expenses are paid by means of mobile payment in the whole process, and no manual charge is allowed; the barrier gate will automatically forbid non-payment vehicles to leave the parking lot;

6.5) clear parking method use text-picture indication boards and pictorials are placed at the entrance and exit of the parking lot as well as many places in the parking lot to instruct how to use the parking spaces conveniently and quickly to temporary vehicles.

We claim:

1. A parking management system, comprising:
an intelligent parking lock: configured to perform two-way data communication with a cloud platform and execute an action instruction issued by the cloud platform;
the cloud platform: configured to store personal information of users, coded information of the parking locks, position information, installation type information, binding information, parking space sharing information, parking space reservation order information, vehicle information, parking space information of a parking lot, fee information, parking lock failure prewarning information and electric quantity prewarning information, to process various operation requests of the users sent through mobile terminals in real time, to return instant information, to acquire state and position data which are sent by the intelligent parking locks in real time, to remotely issue control instructions to the intelligent parking locks, to perform two-way data communication with the intelligent parking locks, user terminals and a management unit, to store map data of a parking lot, to calculate relative positions between the mobile terminals and the intelligent parking locks in real time, and to send the relative positions to the mobile terminals;
the management unit: configured to manage barrier gates of the entrance and exit of a local parking lot, license plate identification devices, guidance screens in the parking lot, a fee module, the parking spaces and the intelligent parking locks, wherein all the data of the management unit are synchronized with those in the cloud platform in real time; and
the mobile terminals: used by vehicle owners to log in accounts, bind and manage the parking locks, share the parking spaces, check the map information of a destination parking lot, the parking space information and the charge information, reserve the parking spaces, start one-key navigation after reservation to perform indoor navigation or reverse search of vehicle in real time after the users drive into the parking lot, and make online payment through the mobile terminal at the end of parking;

wherein each intelligent parking lock includes a micro controller, a power unit, a wireless communication unit, an electric quantity monitoring unit, an anti-collision and anti-damage detection unit, a position sensor, a voice unit, a parking lock driving unit, and a positioning navigation unit; the micro controller is connected with the power unit, the wireless communication unit, the electric quantity monitoring unit, the anti-collision and anti-damage detection unit, the position sensor, the voice unit, the parking lock driving unit and the positioning and navigation unit; the power unit is connected with the electric quantity monitoring unit, and the wireless communication unit communicates with the cloud platform; the positioning and navigation unit communicates with each mobile terminal which communicates with the cloud platform; the power management unit provides rated direct current working voltage for the micro controller, the wireless communication unit, the parking lock driving unit, the anti-collision, and anti-damage detection unit, the voice unit and the positioning and navigation unit; and the parking lock driving unit is connected with a parking lock lifting device through a mechanical transmission mechanism.

2. The parking management system according to claim 1, wherein the wireless communication unit adopts a Wi-Fi communication module or a GPRS (General Packet Radio Service) communication module; the Wi-Fi communication module or he GPRS communication module is connected with the micro controller through a serial port; and the micro controller reads an unlocking/locking instruction received by the wireless communication unit from the cloud platform, controls the parking lock driving unit to drive the parking lock mechanical transmission mechanism and the parking lock lifting device to realize unlocking or locking of the parking lock, and uploads parking lock state information to the cloud platform through the wireless communication unit.

3. The parking management system according to claim 1, wherein a low energy wireless communication module is embedded into the positioning and navigation unit, is connected with the micro controller in a serial port communication manner to complete data communication, and is connected with an I/O port of the micro controller through an I/O port to complete mutual control of signals; the low energy wireless communication module transmits own ID in a broadcasting manner, and generates a varying level signal capable of awakening the dormant micro controller after completing data connection with each mobile terminal; the mobile terminal receives wireless broadcasting ID signals sent by the positioning and navigation unit and a wireless base station deployed near the parking space, and determines a position where the mobile terminal of user is and a target parking space position through a triangular positioning algorithm, so as to realize positioning and navigation; and when the user terminal is beyond a range covered by the wireless broadcasting signal sent by the positioning and navigation unit of the parking lock, the user terminal has no communication interaction with the low energy wireless communication module embedded in the positioning and navigation unit; in a low energy broadcasting mode, the wireless communication module periodically broadcasts the wireless ID; the micro controller is in a dormant state, and the wireless communication unit, the parking lock driving unit and the voice unit are in non-work state; the mobile terminal of the user can generate wireless communication interaction with the low energy wireless communication module embedded in the positioning and navigation unit of the parking lock after starting a wireless receiving function to enter a wireless broadcasting effective covering range sent by the low energy wireless communication module embedded in the positioning and navigation unit of the parking lock and receiving the effective ID signal sent by the positioning and navigation unit of the parking lock control system; and the low energy wireless communication module automatically quits the low energy broadcasting mode and enters a data communication mode; meanwhile, the low energy wireless communication module generates a varying level signal and sends the varying level signal to the I/O port of the micro controller through the I/O port connected with the micro controller to awaken the micro controller in the dormant state and enable the micro controller to enter a work state; and in the work state, the micro controller switches on a wireless communication unit circuit to communicate with the cloud platform, receives the unlocking or locking instruction issued by the cloud platform, and controls the parking lock driving unit to complete unlocking or locking.

4. The parking management system according to claim 1, wherein the electric quantity monitoring unit reports the electric quantity of the battery to the cloud platform, and the cloud platform turns on an undervoltage alarm mechanism.

5. The parking management system according to claim 1, wherein a specific implementation process of the anti-collision and anti-damage detection unit includes:
 1), when the parking lock is damaged by the external force or is collided by a vehicle, the vibration and/or the position offset is generated, and the sensor senses the vibration, and/or position offset generated thereby:
 2), the micro controller switches on the voice unit after receiving these pieces of varying state information to sound an alarm, and sends the alarm state information to the cloud platform through the wireless communication unit; and
 3), the cloud platform turns on the alarm mechanism after receiving these pieces of alarm information.

6. The parking management system according to claim 4, wherein a specific implementation process of the electric quantity monitoring unit for monitoring the electric quantity of a battery includes:
 1) the battery voltage is linearly reduced through the voltage division resistor, and then is sent to the ADC for analog/digital conversion;
 2) the micro controller reads the voltage digital value obtained by conversion, and compares the voltage digital value with a set alarm threshold value;
 3) when the voltage digital value is lower than the alarm threshold value, the voice unit is switched on to sound the alarm, and an undervoltage state marker is sent to the cloud platform through the wireless communication unit; when the voltage digital value is not lower than the alarm threshold value, the current electric quantity data are sent to the cloud platform through the wireless communication unit; and
 4) the cloud platform turns on an undervoltage alarm mechanism after receiving undervoltage state information, so as to inform the user or the parking lot management personnel to conduct maintenance and mark the parking lock in an undervoltage state.

7. The parking management system according to claim 4, wherein a specific implementation process of the electric quantity monitoring unit for monitoring the electric quantity of the battery includes:

1) the battery voltage is linearly reduced through the voltage division resistor or is directly sent to the voltage comparator for comparison with alarm threshold voltage;
2) the comparator sends the high or low level including the comparison result to the I/O port of the micro controller;
3) the micro controller reads the state of the I/O port to identify whether it is undervoltage or not, and when YES, the voice unit is switched on to sound an alarm, and the undervoltage state marker is sent to the cloud platform through the, wireless communication unit; and
4) the cloud platform turns on the undervoltage alarm mechanism to inform the user or the parking lot management personnel to conduct maintenance and mark the parking lock in an undervoltage state.

8. A parking space management method, comprising:
(I) a navigation positioning and automatic unlocking part:
1) broadcasting, via wireless base stations installed on both sides of a road in the parking lot and positioning and navigation units in, intelligent parking locks, signals including parking lock IDs;
2) using, by a driver driving into the parking lot, a mobile terminal with a started wireless communication function;
3) scanning, by the mobile terminal, one of the signals including the parking lock IDs, and sending the scanned signal including the parking lock ID and the intensity of the signal to the cloud platform; wherein the cloud platform determines the position where the mobile terminal of the user is located and a target parking space position through a triangular positioning algorithm, so as to provide positioning and navigation for the mobile terminal;
4) when the mobile terminal finds the target parking lock ID, and the intensity of the signal including the target parking lock ID is equal to an unlocking threshold value, sending, by the cloud platform or the mobile terminal, an unlocking instruction to the, parking lock;
5) after receiving the unlocking instruction, switching on, by the parking lock a parking lock driving unit circuit to drive a mechanical transmission mechanism and a lifting device to complete an automatic unlocking action;
6) sending parking lock state information to the cloud platform for processing through a wireless communication unit for user query;
(II) a positioning and automatic locking part:
1) when the mobile terminal scans no signal including the target parking lock ID or the intensity of the scanned signal is lower than the threshold value, which indicates that the vehicle has been parked and the driver carrying the mobile terminal has left the place near the parking lock, uploading, by the mobile terminal, position information to the cloud platform;
2) issuing, by the cloud platform, a locking instruction to the parking lock according to the position information uploaded by the mobile terminal, and the parking lock switches on the parking lock driving unit to complete a parking lock locking action;
3) sending parking lock state information to the cloud platform for processing through the wireless communication unit and for user query at the same time;
(III) parking lock binding:
1) inputting parking lock codes and parking lock binding codes into the mobile terminals;
2) when the users type in the correct parking lock codes and parking lock binding codes, indicating binding success:
(IV) parking space sharing:
1) displaying each mobile terminal parking locks which have been bound by the user at present;
2) sharing, by the user, a parking lock which has not been shared yet at present through the mobile terminal, and setting a time period for sharing;
3) analyzing, verifying and storing, by the cloud platform, data submitted by the user; and within the time period for sharing, forbidding, by the cloud platform, the user to randomly control the parking lock to be unlocked and locked;
4) within the time period for sharing, which is set by the user, when the parking space is not reserved and no real-time orders are produced, canceling, by the user, the parking space sharing;
(V) the way for a user who has made a reservation to use the parking space:
1) connecting, by the user, the mobile terminal to an Internet;
2) typing, by the user, in a parking destination, and checking a list of parking lots near the destination and the number of remaining parking spaces;
3) selecting, by the user, parking spaces to be reserved on a garage map of a parking lot with the mobile terminal to reserve available parking spaces in the parking lot;
4) calculating, by the cloud platform, a due prepaid expense according to a reserved parking space retention rule and a parking expense rule of the current parking, lot, and displaying, by the mobile terminal, the due prepaid expense; after paying the money successfully, submitting, by the user, reservation order information to the cloud platform;
5) sending, by the cloud platform, the order information to a management unit, and sending reservation success information to the mobile terminal of the user to indicate the user to turn on the Bluetooth function and the Wi-Fi connection function of the mobile terminal;
6) after reserving the parking space successfully, using, by the user, the mobile terminal to automatically navigate to the entrance of the parking lot;
7) matching, by the management unit, the reservation order information with license plate information of the current user, so as to automatically open a barrier gate to let the reservation vehicle pass;
8) judging, by the cloud platform, the current position of the user according to all the broadcast ID signals scanned by the mobile terminal of the user and the intensity of each signal, converting the position of the mobile terminal of the user in the map of the parking lot into user real-time coordinates in combination with coordinates of the target parking space and the distance to the target parking space, and conducting route planning and route, guidance;
9) sending, by the cloud platform, a route plan to the mobile terminal, and sending a route guidance to parking guidance screens in the parking lot;
10) checking, by the user, a route plan track in real time through the mobile terminal, and navigating to the reserved parking space according to the track, or driving to the preserved parking space according to the route guidance on the parking guidance screens in the parking lot;
11) when the user reaches the place near the reserved parking space, and at the moment, the mobile terminal of the user scans the signal including the target parking lock ID, and the intensity of the signal is equal to the unlocking threshold value, issuing, by the cloud platform, the unlocking instruction to the parking lock; after receiving the unlocking instruction, switching on, by the parking lock, on the parking lock driving unit circuit to drive the mechanical transmission mechanism and the lifting device to realize automatic unlocking;

12) sending, by the parking lock, state information to the cloud platform in real time for processing and user query;

(VI) the way for a temporary vehicle to use a parking space:

1) when the vehicle reaches the entrance of the parking lot, displaying, by a display screen at the entrance of the parking lot, the number of remaining parking spaces; when all the parking spaces in the, garage are occupied, the barrier gate is not opened, forbidding the vehicle to enter; when there are still, parking spaces unoccupied in the garage, the barrier gate is automatically opened to allow the vehicle to enter;

2) selecting, by the user, parking spaces to be reserved with the mobile terminal to reserve available parking spaces;

3) calculating, by the cloud platform, a due prepaid expense according to the reserved parking space retention rule and the parking expense rule of the current parking lot, and displaying, by the mobile terminal, the due prepaid expense; after paying the money successfully, submitting, by the user, reservation order information to the cloud platform;

4) sending, by the cloud platform, the order information to the parking lot management system, sending reservation success information to the mobile terminal of the user, and indicating the user to turn on the Bluetooth function and the Wi-Fi connection function of the mobile terminal;

5) judging, by the cloud platform, the current position of the user according to all the current surrounding broadcast ID signals scanned by the mobile terminal of the user and the intensity of each signal, converting the position of the mobile terminal of the user in the map of the parking lot into user real-time coordinates in combination with coordinates of a target parking space, and the distance to the target parking space, and conducting route planning and route guidance;

6) checking, by the user, a route plan track in real time through the mobile terminal, and navigating to the reserved parking space according to the track, or driving to the preserved parking space according to the route guidance on the parking guidance screens in the parking lot;

7) when the user reaches the place near the reserved parking space, and at the moment, the mobile terminal of the user scans the signal including the target parking lock ID and the intensity of the signal is equal to the unlocking threshold value, issuing, by the cloud platform, the unlocking instruction to the parking lock; after receiving the unlocking instruction, switching on, by the parking lock, the parking lock driving unit circuit to drive the mechanical transmission mechanism and the lifting device to realize automatic unlocking;

8) sending, by the parking lock, state information to the cloud platform in real time for processing, and user query;

(VII) User finds the vehicle reversely and drives the vehicle away from the garage:

A. when each intelligent parking lock in the parking lot is installed at the entrance of each parking space, 1) when the mobile terminal scans no signal including the target parking lock ID or the intensity of the scanned signal is lower than the threshold value, issuing, by the cloud platform, a locking instruction to the parking lock and the parking lock switches on the parking lock driving unit to complete locking and sends parking, lock state information to the cloud platform;

2) sending, by the user, all the broadcast ID signals and the intensities of the signals to the cloud platform by using the mobile terminal, and planning, by the cloud platform, a vehicle finding route in real time according to the coordinates of the user and the coordinates of the parking space, and guiding the user to walk to the parking space;

3) acquiring, by the cloud platform, an unlocking request from the user;

4) generating, by the cloud platform, order payment information in real time according to an actual parking time length of the user, and sending the information to the mobile terminal of the user;

5) making, by the user, a payment for the order through the mobile terminal;

6) when detecting that the user completes the payment, sending, by the cloud platform, latest order information to the mobile terminal of the user and the parking lot management system, and issuing an unlocking instruction to the intelligent parking lock;

7) after receiving the unlocking instruction, switching on, by the intelligent parking lock, the parking lock driving unit circuit to drive the mechanical transmission mechanism and the lifting device to automatically lower the parking lock to complete unlocking, and sending parking lock state information to the cloud platform;

8) after the user completes the payment, when the mobile terminal is near the parking lock, when the intensity of the signal including the target parking lock ID, scanned by the mobile terminal, lasts for a time greater than a set normal time threshold value, sending, by the cloud platform, alarm signals to the parking lock and the mobile terminal at the same time to remind the user to drive the vehicle away from the parking space;

9) when the mobile terminal is not near the parking lock, and cannot scan the signal including the target parking lock ID or the intensity of the scanned signal is lower than the threshold value, issuing, by the cloud platform, a locking instruction to the parking lock, and switching on, by the parking lock, the parking lock driving unit to complete locking, and sending parking, lock state information to the, cloud platform;

10) when the user reaches the exit of the parking lot, matching, by the parking lot management system, the latest order information of the user, and automatically opening the harrier gate to let the vehicle pass;

B. when, each intelligent parking lock in the parking lot is installed at the middle part of each parking space, 1) when the mobile terminal scans no signal including the target parking lock ID or the intensity of the scanned signal is lower than the threshold value, stopping, by the parking lock, the locking operation, and then sending parking lock state information to the cloud platform in real time;

2) scanning, by the mobile terminal, all the broadcast ID signals and sending the scanned broadcast ID signals and the, intensities of the, signals to the cloud platform, and planning, by the cloud platform, a vehicle finding, route according to the coordinates of the user and the coordinates of, the parking space immediately, and guides the user, to walk to the parking space;

3) making, by the user, a payment for an order, and generating, by the cloud platform, order payment information in real time according to an actual parking time length of the user, and sending the, information to the mobile terminal of the user;

4) making, by the user, a payment for the order through the mobile terminal;

5) when the mobile terminal is not near the parking lock, and cannot scan the Bluetooth broadcast signal including the target parking lock ID or the intensity of the scanned signal is lower than the threshold value, issuing, by the cloud platform, a locking instruction to the parking lock, and switching on, by the parking lock, the parking lock driving unit to complete locking, and sending parking lock state information to the cloud platform;

6) when the user reaches the exit of the parking lot, the parking lot management system matches the license plate information of the user;

7) when the user has paid the expense, opening, by the parking lot management system, the barrier gate to let the vehicle pass, and sending, by the local management system, latest state information of the order of the user to the cloud platform; when the user does not pay the parking expense before reaching the exit, closing the barrier gate of the exit of the garage, and sending, by the parking lot management system at the exit, non-payment vehicle information and time to the cloud platform;

8) generating, by the cloud platform, the order payment information in, real time according to the actual parking time length of the user, and sending the information to the mobile terminal of the user;

9) making, by the user, a payment for the order through the mobile terminal;

10) when detecting that the user completes the payment, sending, by the cloud platform, the latest order information to the mobile terminal of the user and the parking lot management system;

11) matching, by the parking lot management system, the latest order information of the user, and automatically opening the barrier gate to let the vehicle pass.

9. The method according to claim 8, wherein after the step 12), "the parking lock sends state information to the cloud platform in real time for processing and user query", of the way for a user who has made a reservation to use the parking space (V) in claim 8:

A. when each intelligent parking lock in the parking lot is installed at the entrance of each parking space:

13) when the mobile terminal scans no signal including the target parking lock ID or the intensity of the scanned signal is lower than the threshold value, issuing, by the cloud platform, a locking instruction to the parking lock, and at the moment, raising up the parking lock, automatically to complete locking, and sending parking lock state information to the cloud platform;

14) when the intensity of the signal including the target parking lock ID, scanned by the mobile terminal, lasts for a time greater than a set normal parking time threshold value, sending, by the cloud platform, alarm signals to the parking lock and the mobile terminal at the same time, and issuing a locking instruction to the parking lock, so that the parking lock automatically rises up to complete locking; meanwhile, sending, by the parking lock, the parking lock state information to the cloud platform in real time;

15) after parking the vehicle, sending, by the user, a locking request to the cloud platform through the mobile terminal; at the moment, after receiving the request of the user, issuing, by the cloud platform, the locking instruction to the parking lock, so that the parking lock automatically rises up to complete locking;

B. when, each intelligent parking lock in the parking lot is installed at the middle part of each parking space:

13) when the intensity of the signal including the target parking lock ID, scanned by the mobile terminal, lasts for a time greater than a set normal parking time threshold value, sending, by the cloud platform, an alarm signal instead of a locking instruction, and sending, by the parking lock, real-time state information to the cloud platform; and 14) after the user parks the vehicle on the parking space having the parking lock at the middle part, stopping displaying, by the mobile terminal, a locking operation entrance.

10. The method according to claim 8, wherein after the step 8), "the parking lock sends state information to the cloud platform in real time for processing, and user query", of the way for the temporary vehicle to use the parking space (VI) in claim 8:

A. when each intelligent parking lock in the parking lot is installed at the entrance of each parking space:

9) when the mobile terminal scans no signal including the target parking lock ID or the intensity of the scanned signal is lower than the threshold value, issuing, by the cloud platform, a locking instruction to the parking lock, and at the moment, raising up the parking lock automatically to complete locking, and sending parking lock state information to the cloud platform;

10) when the intensity of the signal including the target parking lock ID, scanned by the mobile terminal, lasts for a time greater than a set normal parking time threshold value, sending, by the cloud platform, alarm signals to the parking lock and the mobile terminal at the same time, and issuing a locking instruction to the parking, lock, so that the parking lock automatically rises up to complete locking; meanwhile, sending, by the parking lock, the parking lock state information to the cloud platform in real time; after parking the vehicle, sending, by the user, a locking request to the cloud platform through the mobile terminal; at the moment, after receiving the request of the user, issuing, by the cloud platform, the locking instruction to the parking lock, so that the parking lock automatically rises up to complete locking;

B. when, each intelligent parking lock in the parking lot is installed at the middle part of each parking space:

9) when the intensity of the signal including the target parking lock ID, scanned by the mobile terminal, lasts for a time greater than a set normal parking time threshold value, sending, by the cloud platform, an alarm signal instead of a locking instruction, and sending, by the parking lock, real-time state information to the cloud platform; and 10) after the user parks the vehicle on the parking space having the parking lock at the middle part, stopping displaying, by the mobile terminal, a locking operation entrance.

* * * * *